US012701439B2

(12) United States Patent
Xu et al.

(10) Patent No.: US 12,701,439 B2
(45) Date of Patent: Aug. 4, 2026

(54) WIRELESS ELECTRONIC DEVICE, WIRELESS COMMUNICATION METHOD FOR BEAM FAILURE RECOVERY

(71) Applicant: Sony Group Corporation, Tokyo (JP)

(72) Inventors: Jin Xu, Beijing (CN); Ying Zhou, Beijing (CN); Xinli Wang, Beijing (CN); Xiaofeng Tao, Beijing (CN); Jianfei Cao, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 432 days.

(21) Appl. No.: 18/246,035

(22) PCT Filed: Oct. 15, 2021

(86) PCT No.: PCT/CN2021/124064
§ 371 (c)(1),
(2) Date: Mar. 21, 2023

(87) PCT Pub. No.: WO2022/083510
PCT Pub. Date: Apr. 28, 2022

(65) Prior Publication Data
US 2023/0362687 A1    Nov. 9, 2023

(30) Foreign Application Priority Data

Oct. 22, 2020    (CN) .......................... 202011140258.3

(51) Int. Cl.
*H04W 24/04*        (2009.01)
*H04W 24/08*        (2009.01)
(52) U.S. Cl.
CPC ........... *H04W 24/04* (2013.01); *H04W 24/08* (2013.01)

(58) Field of Classification Search
CPC ... H04W 24/04; H04W 24/08; H04W 72/046; H04B 7/06964; H04B 7/022; H04L 5/0048
See application file for complete search history.

(56) References Cited

U.S. PATENT DOCUMENTS

2019/0081675 A1 *    3/2019    Jung ....................... H04B 7/063
2019/0379506 A1 *    12/2019    Cheng ................... H04W 88/06
(Continued)

FOREIGN PATENT DOCUMENTS

CN        109474950 A        3/2019
CN        109803275 A        5/2019
(Continued)

OTHER PUBLICATIONS

International Search Report and Written Opinion mailed on Jan. 14, 2022, received for PCT Application PCT/CN2021/124064, filed on Oct. 15, 2021, 8 pages including English Translation.
(Continued)

*Primary Examiner* — Rebecca E Song
*Assistant Examiner* — Cason H Morse
(74) *Attorney, Agent, or Firm* — XSENSUS LLP

(57)            ABSTRACT

Provided are an electronic device, a wireless communication method, and a non-transitory computer-readable storage medium. The electronic device comprises a processing circuit. The processing circuit is configured to: respectively receive a pre-configured first reference signal set and a pre-configured second reference signal set from a first transmission and reception point and a second transmission and reception point, wherein each reference signal set comprises at least one reference signal; determine, on the basis of the measured signal quality of each reference signal in each reference signal set, a beam failure reference signal in which a beam failure event occurs; and transmit, when it is
(Continued)

Start

Receive a first reference signal set of TRP1 and a second reference signal set of TRP2 — S1501

Determine a beam failure reference signal on which a beam failure event occurs — S1502

Transmit a beam failure recovery request to a base station — S1503

End determined that a beam failure event occurs in at least one reference signal, a beam failure recovery request to a base station.

11 Claims, 13 Drawing Sheets

(56)                    References Cited

U.S. PATENT DOCUMENTS

| | | | | |
|---|---|---|---|---|
| 2020/0092785 A1* | 3/2020 | Yang | .................. | H04B 7/06964 |
| 2020/0107235 A1* | 4/2020 | Peisa | ..................... | H04W 74/02 |
| 2020/0221429 A1* | 7/2020 | Li | ......................... | H04L 5/0053 |
| 2020/0314722 A1* | 10/2020 | Kyung | ................ | H04W 72/569 |
| 2020/0350972 A1* | 11/2020 | Yi | ........................... | H04B 7/088 |
| 2021/0282168 A1* | 9/2021 | Matsumura | ........... | H04L 5/0048 |
| 2022/0046750 A1* | 2/2022 | Jeon | ...................... | H04W 36/06 |
| 2022/0103232 A1* | 3/2022 | Zhou | .................. | H04W 72/046 |
| 2022/0104038 A1* | 3/2022 | Zhou | ...................... | H04B 7/022 |
| 2022/0141814 A1* | 5/2022 | Fan | ....................... | H04W 24/04 |
| | | | | 370/329 |
| 2024/0088978 A1* | 3/2024 | Gao | .................... | H04W 72/569 |

FOREIGN PATENT DOCUMENTS

| | | | |
|---|---|---|---|
| CN | 110637496 | A | 12/2019 |
| CN | 110896546 | A | 3/2020 |
| CN | 111278032 | A | 6/2020 |
| CN | 111278122 | A | 6/2020 |
| WO | WO-2020012619 | A1 | 1/2020 |
| WO | WO-2020048443 | A1 | 3/2020 |

OTHER PUBLICATIONS

Vivo, "Discussion on MTRP multi-beam enhancement", 3GPP TSG RAN WG1 #102-e, R1-2005366, Aug. 17-28, 2020, 5 pages.
Samsung, "New WID: Further enhancements on MIMO for NR", 3GPP TSG RAN Meeting #86, RP-193133, Dec. 9-12, 2019, 5 pages.
Samsung, "On Rel.17 FeMIMO WI", 3GPP Draft, RI-2003918, 3rd Generation Partnership Project (3GPP), May 15, 2020 (May 15, 2020), pp. 1-12, vol. RAN WG1, No. e-Meeting, XP051885684.

* cited by examiner

200

| |
|---|
| Reception unit 210 |
| Determination unit 220 |
| Requesting unit 230 |

1300

Configuration unit 1310

Reception unit 1320

Response unit 1330

WIRELESS ELECTRONIC DEVICE, WIRELESS COMMUNICATION METHOD FOR BEAM FAILURE RECOVERY

CROSS-REFERENCE TO RELATED APPLICATIONS

The present application is based on PCT filing PCT/CN2021/124064, filed Oct. 15, 2021, which claims priority to Chinese Patent Application No. 202011140258.3, titled "ELECTRONIC DEVICE, WIRELESS COMMUNICATION METHOD, AND NON-TRANSITORY COMPUTER-READABLE STORAGE MEDIUM", filed on Oct. 22, 2020 with the China National Intellectual Property Administration, each of which is incorporated herein by reference in its entirety.

FIELD

The present disclosure relates to the technical field of wireless communications, and in particular to an electronic device and a wireless communication method suitable for performing beam failure recovery in a scenario including multiple transmission and reception points (TRPs) (also called multi transmission points), and a non-transitory computer-readable storage medium.

BACKGROUND

In order to ensure the reliability of communication using directional beams in a system such as a high-frequency wireless communication system based on the 5th generation (5G) mobile communication technology, a beam failure recovery (BFR) mechanism is provided according to the conventional technology. In the mechanism, a user equipment monitors all reference signals in a reference signal set configured by a base station for beam failure detection (BFD), and reports a beam failure instance to a high layer of the user equipment when a beam failure occurs on each of the reference signals (that is, beams corresponding to all the reference signals), so that the high layer may, for example, when a count of beam failure instances reaches a predetermined threshold, confirm that a beam failure event occurs, and request the base station for beam failure recovery processing.

However, in a multi TRP scenario, due to different positions of the different TRPs, directions of beams are different, which may result in a situation in which a beam failure occurs at one TRP and another TRP operates normally. With the beam failure recovery mechanism according to the conventional technology, the user equipment will not request beam failure recovery processing in this situation, affecting the performance of the user equipment.

Therefore, it is required to provide a beam failure recovery process suitable for a multi TRP scenario.

SUMMARY

A brief summary of the present disclosure is given below to provide a basic understanding in some aspects of the present disclosure. It should be understood that the summary is not an exhaustive summary of the present disclosure. The summary is not intended to determine a critical part or an important part of the present disclosure or limit the scope of the present disclosure. A purpose of the summary is only to provide some concepts in a simplified manner, serving as a preamble of a more detailed description described later.

In view of the above problems, an electronic device, a wireless communication method, and a non-transitory computer-readable storage medium are provided according to at least one aspect of the present disclosure, suitable for performing beam failure recovery processing in a multi TRP scenario.

According to an aspect of the present disclosure, an electronic device is provided. The electronic device includes processing circuitry. The processing circuitry is configured to: receive a pre-configured first reference signal set from a first transmission and reception point and a pre-configured second reference signal set from a second transmission and reception point, where each of the first reference signal set and the second reference signal set includes one or more reference signals; determine a beam failure reference signal on which a beam failure event occurs based on measured signal qualities of the reference signals included in each of the first reference signal set and the second reference signal set; and transmit a beam failure recovery request to a base station in a case that it is determined that the beam failure event occurs on one or more reference signals.

According to another aspect of the present disclosure, an electronic device is provided. The electronic device includes processing circuitry. The processing circuitry is configured to: provide beam failure recovery configuration information to a user equipment, where the beam failure recovery configuration information includes configuration information of a first reference signal set of a first transmission and reception point and configuration information of a second reference signal set of a second transmission and reception point, each of the first reference signal set and the second reference signal set includes one or more reference signals, so that the user equipment determines a beam failure reference signal on which a beam failure event occurs based on measured signal qualities of the reference signals included in each of the first reference signal set and the second reference signal set; and receive a beam failure recovery request from the user equipment in a case that it is determined that the beam failure event occurs on one or more reference signals.

According to another aspect of the present disclosure, a wireless communication method is provided. The method includes: receiving a pre-configured first reference signal set from a first transmission and reception point and a pre-configured second reference signal set from a second transmission and reception point, where each of the first reference signal set and the second reference signal set includes one or more reference signals; determining a beam failure reference signal on which a beam failure event occurs based on measured signal qualities of the reference signals included in each of the first reference signal set and the second reference signal set; and transmitting a beam failure recovery request to a base station in a case that it is determined that the beam failure event occurs on one or more reference signals.

According to another aspect of the present disclosure, a wireless communication method is provided. The method includes: providing beam failure recovery configuration information to a user equipment, where the beam failure recovery configuration information includes configuration information of a first reference signal set of a first transmission and reception point and configuration information of a second reference signal set of a second transmission and reception point, each of the first reference signal set and the second reference signal set includes one or more reference signals, so that the user equipment determines a beam failure reference signal on which a beam failure event occurs based on measured signal qualities of the reference signals included in each of the first reference signal set and the second reference signal set; and receiving a beam failure recovery request from the user equipment in a case that it is determined that the beam failure event occurs on one or more reference signals.

According to another aspect of the present disclosure, a non-transitory computer-readable storage medium storing executable instructions is provided. The executable instructions, when executed by a processor, cause the processor to perform the wireless communication method or the functions of the electronic device described above.

According to other aspects of the present disclosure, computer program codes and computer program products for performing the wireless communication method according to the present disclosure are further provided.

According to at least one aspect of the embodiments of the present disclosure, in the multi TRP scenario, the user equipment may perform beam failure detection on a reference signal set individually configured for each of TRPs, and may trigger a beam failure recovery process in a case that a beam failure occurs on some (at least one) of reference signals in the reference signal set, thereby avoiding performance degradation caused by ignoring beam failures occurred at some TRPs according to the conventional technology.

Other aspects of the embodiments of the present disclosure are provided in the following specification, in which preferred embodiments for fully disclosing the embodiments of the present disclosure are described in detail without imposing restrictions on the embodiments of the present disclosure.

BRIEF DESCRIPTION OF THE DRAWINGS

The accompanying drawings described herein only illustrate some selected embodiments rather than all possible implementations, and are not intended to limit the scope of the present disclosure. In the drawing.

Figures 1, 2:
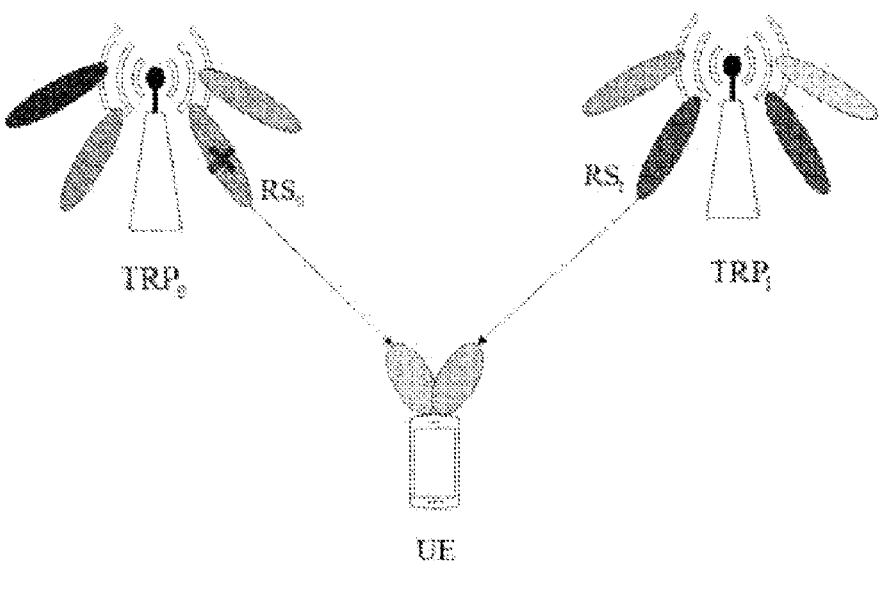
FIG. 1 is a schematic diagram showing an example of a beam failure event in a multi TRP scenario according to the conventional technology.
FIG. 2 is a block diagram showing a configuration example of an electronic device at a user equipment side according to an embodiment of the present disclosure.

Although the present disclosure may be susceptible to various modifications and alternative forms, specific embodiments thereof have been shown by way of examples in the drawings and have been described in detail herein. However, it should be understood that the description of specific embodiments herein is not intended to limit the present disclosure to the particular forms disclosed, but rather to cover all modifications, equivalents, and alternatives falling within the spirit and scope of the present disclosure. It should be noted that same or similar reference numerals are used throughout the drawings to refer to the same or like parts.

DETAILED DESCRIPTION OF EMBODIMENTS

The embodiments of the present disclosure will be described completely in conjunction with the drawings. The following description is only exemplary, and is not intended to limit the present disclosure, and applications or usages thereof.

Exemplary embodiments are provided so that the present disclosure will be thorough and complete, and will fully convey the scope of the present disclosure to those skilled in the art. Numerous specific details, such as examples of specific components, devices, and methods, are described to provide a detailed understanding of the embodiments of the present disclosure. It is apparent for those skilled in the art that the exemplary embodiments may be implemented in many different forms without specific details, and should not be construed to limit the scope of the present disclosure. In some exemplary embodiments, well-known processes, well-known structures, and well-known technologies are not described in detail.

The descriptions are provided in the following order:
1. Description of problems;
2. Configuration examples of an electronic device;
   2.1 Configuration examples of an electronic device at a user equipment side;
     2.1.1 Configuration examples;
     2.1.2 Exemplary scenarios in which a beam failure recovery request is transmitted;
     2.1.3 Exemplary manners in which a beam failure recovery request is transmitted;
   2.2 Configuration examples of an electronic device at a base station side;
     2.2.1 Configuration examples;
     2.2.2 Exemplary scenarios in which a beam failure recovery request is received;
     2.2.3 Examples of a received beam failure recovery request;
3. Examples of an information interaction process;
4. Method embodiments;
   4.1 Method embodiments at a user equipment side;
   4.2 Method embodiments at a base station side; and
5. Application examples.

1. DESCRIPTION OF PROBLEMS

With the beam failure recovery (BFR) mechanism according to the conventional technology, a user equipment monitors all reference signals in a reference signal set configured by a base station for beam failure detection, and reports a beam failure instance to a high layer of the user equipment when a beam failure occurs on each of the reference signals (that is, beams corresponding to all the reference signals), so that the high layer may, for example, when a count of beam failure instances reaches a predetermined threshold, confirm that a beam failure event occurs, and request the base station for beam failure recovery processing.

However, in a scenario such as a multi TRP scenario shown in FIG. 1, the user performance may be reduced with the beam failure recovery mechanism according to the conventional technology. FIG. 1 is a schematic diagram showing an example of a beam failure in a multi TRP scenario according to the conventional technology. A user equipment UE shown in FIG. 1 is pre-configured with a reference signal set $\{RS_0, RS_1\}$ for beam failure detection, and monitors reference signals $RS_0$ and $RS_1$ from $TRP_0$ and $TRP_1$. Due to the different positions of $TRP_0$ and $TRP_1$, directions of beams of the reference signals from $TRP_0$ and $TRP_1$ are different, which may result in a situation in which a beam failure event occurs on both a reference signal $RS_0$ and a reference signal $RS_1$ (not shown in FIG. 1) from $TRP_0$ and a reference signal $RS_1$ from $TRP_1$ operates normally. With the beam failure recovery mechanism according to the conventional technology, for the UE, at least no beam failure occurs on the reference signal $RS_1$, thus the UE will not request beam failure recovery processing, affecting the performance of the UE.

Therefore, an electronic device, a wireless communication method applied in electronic device, and a non-transitory computer-readable storage medium are provided according to the present disclosure, suitable for performing beam failure recovery processing in a multi TRP scenario.

The user equipment in the present disclosure may be implemented as various user equipments, for example, a mobile terminal (such as a smart phone, a tablet personal computer (PC), a notebook PC, a portable game terminal, a portable/dongle type mobile router, and a digital camera device), or an in-vehicle terminal (such as a car navigation device). The user equipment may also be implemented as a terminal (which is also referred to as a machine type communication (MTC) terminal) that performs machine-to-machine (M2M) communication. Furthermore, the user equipment may be a wireless communication module (such as an integrated circuit module including a single chip) mounted on each of the terminals.

The electronic device at the base station side according to the present disclosure may be the base station apparatus itself, for example, may be an eNB (evolutionary node B) or a gNB. In addition, in the context according to the present disclosure, the TRP that interact with the electronic device at the base station side and/or the electronic device at the user equipment side may be of any type of TRP. The TRP may have transmitting and receiving functions, for example, the TRP may receive information from the user equipment and the base station apparatus, and may also transmit information to the user equipment and the base station apparatus. In an example, the TRP may provide services for the user equipment and is controlled by the base station apparatus. That is, the base station apparatus may provide services to the user equipment through the TRP. In some embodiments or examples below, descriptions are provided by taking an example in which the base station apparatus is directly used as the electronic device at the base station side. However, the present disclosure is not limited to the descriptions, and may be appropriately applied to electronic devices with similar functions.

2. CONFIGURATION EXAMPLES OF AN ELECTRONIC DEVICE

[2.1 Configuration Examples of an Electronic Device at a User Equipment Side]
(2.1.1 Configuration Examples)

FIG. 2 is a block diagram showing a configuration example of an electronic device at a user equipment side according to an embodiment of the present disclosure.

As shown in FIG. 2, an electronic device 200 may include a reception unit 210, a determination unit 220, and a requesting unit 230.

All the units of the electronic device 200 may be included in processing circuitry. It should be noted that the electronic device 200 may include one processing circuitry or multiple processing circuitry. Further, the processing circuitry may include various discrete functional units to perform various functions and/or operations. It should be noted that the functional units may be physical entities or logical entities, and units with different titles may be implemented by the same physical entity.

In addition, an example in which the electronic device 200 is the user equipment itself is described herein. However, it should be understood by those skilled in the art that the electronic device 200 may also be implemented as an electronic device that has the functions of the reception unit 210, the determination unit 220 and the requesting unit 230 and, for example, is connected to a user equipment or communicates with a user equipment.

According to an embodiment of the present disclosure, the reception unit 210 of the electronic device 200 may be configured to receive a pre-configured first reference signal set from a first transmission and reception point (first TRP) and a pre-configured second reference signal set from a second transmission and reception point (second TRP), where each of the first reference signal set and the second reference signal set includes one or more reference signals. The determination unit 220 may be configured to determine a beam failure reference signal on which a beam failure event occurs based on measured signal qualities (measured by the determination unit 220 or other appropriate components of the electronic device 200) of the reference signals included in each of the first reference signal set and the second reference signal set. The requesting unit 230 may be configured to transmit a beam failure recovery request to a base station in a case that it is determined that the beam failure event occurs on one or more reference signals.

Figure 3:
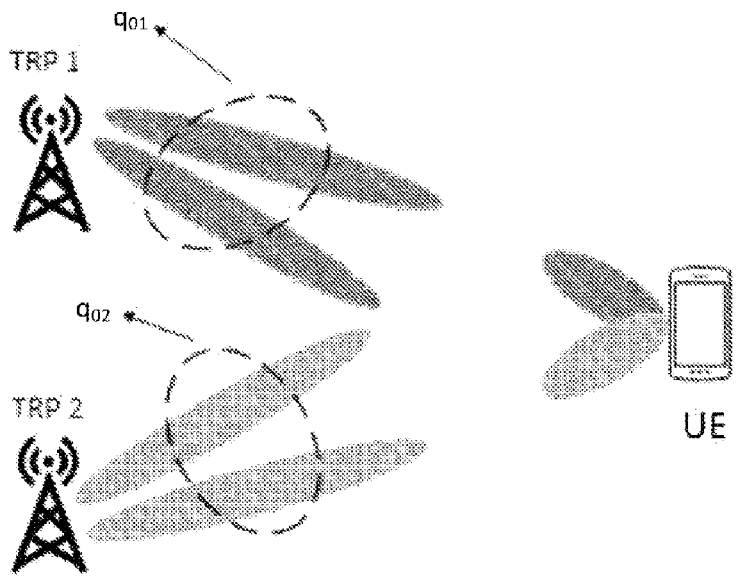
FIG. 3 is a schematic diagram for explaining an exemplary application scenario according to an embodiment of the present disclosure.

Next, further details of the processing performed by the electronic device 200 and the units of the electronic device 200 are explained in combination with an example shown in FIG. 3. FIG. 3 is a schematic diagram for explaining an exemplary application scenario according to the embodiment of the present disclosure. As shown in FIG. 3, the first TRP and the second TRP, that is, TRP1 and TRP2, are respectively configured with a first reference signal set $q_{o1}=\{BFD\text{-}RS_{1\text{-}0}, BFD\text{-}RS_{1\text{-}1}\}$ and a second reference signal set $q_{o2}=\{BFD\text{-}RS_{2\text{-}0}, BFD\text{-}RS_{2\text{-}1}\}$ for beam failure detection.

As an example, it is shown that each of the reference signal sets includes two reference signals. However, the embodiment is not limited to the example. The number of reference signals in each of the reference signal sets is configured by the base station, and is appropriately configured by the base station based on the capability of the UE as an example of the electronic device 200. The reference signal (BFD-RS) used for beam failure detection in the reference signal set, for example, may be a pre-configured non-periodic channel state information reference signal (CSI-RS) signal.

In an embodiment, in an exemplary application such as that shown in FIG. 3, before receiving the reference signal sets from the TRPs, the reception unit 210 of the electronic device 200 may receive beam failure recovery configuration information from the base station in advance, for example, through a radio resource control (RRC) signaling. The beam failure recovery configuration information received in advance by the electronic device 200 through the reception unit 210 may include, for example, configuration information of the first reference signal set $(q_{o1})$ of the first transmission and reception point (TRP1) and configuration information of the second reference signal set $(q_{o2})$ for the second transmission and reception point (TRP2). The configuration information of the reference signal sets may include, for example, information for indicating each of reference signal BFD-RS in each of the reference signal sets. As an example, the configuration information may include an index (that is, an example of identification information) of each of the BFD-RSs (such as periodic CSI-RSs).

In addition, in an embodiment, the beam failure recovery configuration information received in advance by the electronic device 200 may further include, for example, configuration information of a criteria for a beam failure event. The configuration information of the criteria for the beam failure event may include, for example, but is not limited to: configuration information indicating a signal quality threshold for determining that a beam failure instance occurs on a BFD-RS (such as a Block Error Rate (BLER) threshold BLER_s), where the BLER_s, as the signal quality threshold, may be configured separately for each of the BFD-RSs or be configured uniformly; configuration information (for example, including an initial value, such as 0, of a counter and a maximum count threshold for determining a beam failure event) about a counter that is individually configured for each of the BFD-RSs and used for counting beam failure instances; and the like.

In an embodiment, the beam failure recovery configuration information received in advance by the electronic device 200 from the base station through the reception unit 210 may further include, for example, configuration information of a first candidate beam set $(q_{11})$ of the first transmission and reception point (TRP1) and configuration information of a second candidate beam set $(q_{12})$ of the second transmission and reception point (TRP2). That is, in the exemplary scenario according to the embodiment of the present disclosure, the base station may pre-configure a candidate beam set for each of the TRPs. Each of candidate beam sets may include one or more candidate beams. The electronic device 200 at the user equipment side may pre-obtain the configuration information configured by the base station for the candidate beam set through the reception unit 210. As an example, the configuration information may include an index (that is, an example of identification information) of a reference signal such as a periodic CSI-RS and/or a synchronization signals and physical broadcast channel (PBCH) block (SSB) corresponding to each of candidate beams in each of the candidate beam sets.

In addition, in an embodiment, the beam failure recovery configuration information received in advance by the electronic device 200 may further include, for example, configuration information about a criteria for determining a candidate beam. The configuration information about the criteria for determining the candidate beam may include, for example, configuration information indicating a signal quality threshold (such as a reference signal receive power (RSRP) threshold) for determining the candidate beam.

In an embodiment, the beam failure recovery configuration information received in advance by the electronic device 200 may further include, for example, configuration information about a beam failure recovery request to be transmitted by the electronic device 200 as the user equipment. The configuration information about the beam failure recovery request may include, for example, information (such as, information indicating an identification of a scheduling request) indicating a scheduling request that may be at least a part of the beam failure recovery request, information for associating a scheduling request that may be at least a part of the beam failure recovery request with a beam failure reference signal, and the like. The electronic device 200 may transmit a beam failure recovery request in an appropriate manner based on the configuration information about the beam failure recovery request, which will be further described in the "Exemplary manners in which a beam failure recovery request is transmitted" part.

In addition, in an embodiment, the beam failure recovery configuration information received in advance by the electronic device 200 may further include configuration information about priority, such as configuration information indicating that a priority of the beam failure recovery request is configured to be higher than a priority of a hybrid automatic retransmission request. With the configuration information about the priority, for example, in a case that a beam failure recovery request or at least a part (such as a scheduling request described in detailed later) of the beam failure recovery request transmitted through a Physical Uplink Control Channel (PUCCH) collides with a hybrid automatic retransmission request, the electronic device preferentially transmits the beam failure recovery request and, for example, discards the hybrid automatic retransmission request, and then transmits the hybrid automatic retransmission request at a later appropriate time instant.

In an example, based on the beam failure recovery configuration information received in advance by the reception unit 210 from the base station, the determination unit 220 may determine a beam failure reference signal on which a beam failure event occurs based on measured signal qualities (that are measured by the determination unit 220 or other appropriate component of the electronic device 200) of the reference signals included in each of the reference signal sets. For example, for a BFD-RS in a reference signal set, the determination unit 210 may periodically measure a BLER of the BFD-RS, and every time the measured BLER is lower than a BLER threshold indicated by the beam failure recovery configuration information, it is determined that a beam failure instance occurs and a counter for the BFD-RS is incremented by one. When the value of the counter for the BFD-RS reaches a maximum count threshold of the counter indicated by the beam failure recovery configuration information, the determination unit 220 may determine that a beam failure event occurs on the BFD-RS. When values of counters for two or more BFD-RSs reach the maximum count threshold simultaneously, the determination unit 220 may determine that a beam failure event simultaneously occurs on the BFD-RSs.

In determining the occurrence of the beam failure event, in an embodiment, the determination unit 220 may further determine a candidate beam in a pre-configured candidate beam set from a transmission and reception point corresponding to a reference signal set to which the beam failure reference signal belongs. The determined candidate beam may be, for example, one or more candidate beams that have a signal quality (for example, indicated by a RSRP) in the corresponding candidate beam set higher than, for example, a predetermined threshold indicated by the beam failure recovery configuration information, or may be a candidate beam having a highest signal quality in the corresponding candidate beam set.

In addition, when the determination unit 220 determines that the beam failure event occurs on one or more reference signals, the requesting unit 230 may transmit a beam failure recovery request (BFRQ) to the base station. The beam failure recovery request transmitted by the request unit 230 may indicate, for example, a beam failure event, a beam failure reference signal and/or a corresponding candidate beam to the base station.

In an embodiment, the requesting unit 230 may divide the beam failure recovery request into different parts, such as a first part and a second part, and transmit the different parts in different steps. For example, the requesting unit 230 may transmit the first part of the beam failure recovery request through a scheduling request (SR) from a physical layer. The requesting unit 230 may transmit the scheduling request to the base station to request uplink resources for transmitting the second part, and then the requesting unit 230 may transmit the second part of the beam failure recovery request by using the uplink resources, which is to be described in detail in the section of "Exemplary manners in which a beam failure recovery request is transmitted".

In response to the beam failure recovery request transmitted by the electronic device 200 through the requesting unit 230, the base station may transmit a corresponding response message or a corresponding confirmation message to the electronic device 200. The electronic device 200, for example, may receive the response message or the determination message from the base station via the reception unit 210, and then perform subsequent beam failure recovery processing based on the response message or the determination message. For example, in a case that the beam failure recovery request transmitted by the electronic device 200 includes information indicating a candidate beam, the response message or the determination message from the base station indicates confirming the candidate beam, so that the electronic device 200 may replace the beam failure reference signal with the candidate beam based on the response message or the determination message as a reference signal BFD-RS in a corresponding reference signal set, and then the electronic device 200 may, for example, perform appropriate subsequent processing in a manner according to the conventional technology.

The configuration examples of the electronic device at the user equipment side according to the embodiments of the present disclosure are described above. As described above, for the multi TRP scenario, with the electronic device according to the embodiments of the present disclosure, beam failure detection can be performed on the reference signal set individually configured for each of TRPs, and a beam failure recovery process can be triggered when a beam failure occurs on some (at least one) of reference signals in the reference signal set, thereby avoiding the performance degradation caused by ignoring beam failures on some TRPs according to the conventional technology.

Hereafter, in combination with an exemplary application shown in FIG. 3, exemplary transmission scenarios and exemplary transmission manners in which an electronic device 200 transmits a beam failure recovery request is described.

(2.1.2 Exemplary Scenarios in which a Beam Failure Recovery Request is Transmitted)

First Exemplary Scenario

Figure 4:
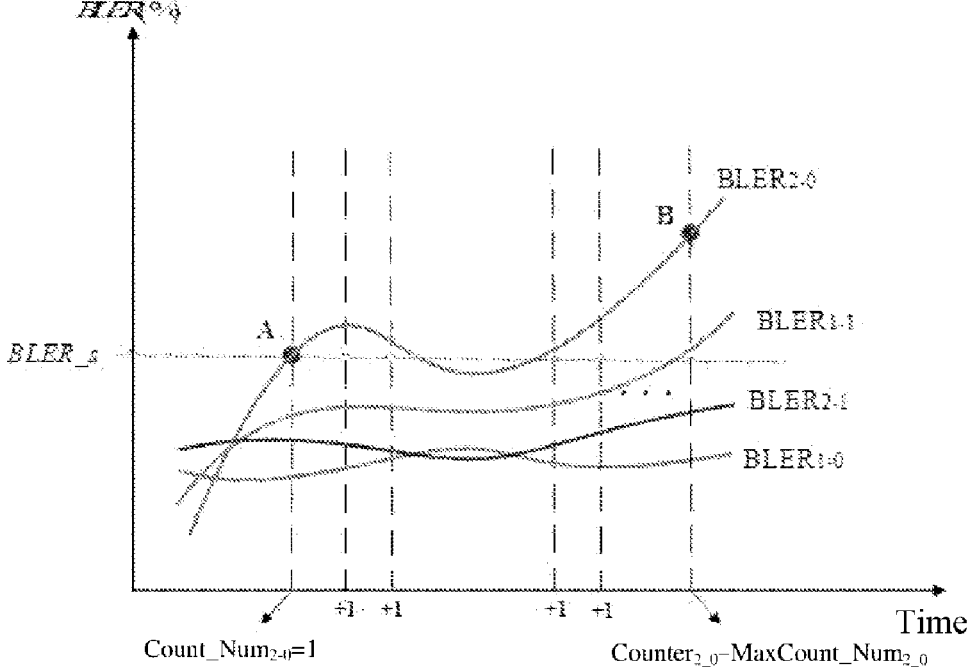
FIG. 4 is an explanatory diagram for explaining a first exemplary scenario in which an electronic device shown in FIG. 2 transmits a failure recovery request.

FIG. 4 schematically shows a schematic diagram of BLER curves (BLER1-0, BLER1-1, BLER2-0, and BLER2-1) measured (for example, by a determination unit 220) based on reference signals (BFD-RS1-0, BFD-RS1-1, BFD-RS2-0, and BFD-RS2-1) in reference signal sets in a first exemplary scenario in which an electronic device 200 shown in FIG. 2 transmits a failure recovery request.

In FIG. 4, point A indicates that the electronic device 200 detects that BLER2-0 corresponding to BFD-RS$_{2\text{-}0}$ in a second reference signal set $q_{02}$ configured for TRP2 exceeds a threshold BLER_s for a first time (where the threshold BLER_s is, for example, set to 10%), then the determination unit 220 may start a pre-configured counter Counter$_{2\_0}$ corresponding to BFD-RS$_{2\text{-}0}$, and a value Count_Num$_{2\text{-}0}$ of the counter Counter$_{2\_0}$ is updated by incrementing by one (Count_Num$_{2\text{-}0}$=1), and then every time BLER$_{2\text{-}0}$ exceeds the threshold BLER_s, the value Count_Num$_{2\text{-}0}$ of the counter Counter$_{2\_0}$ is incremented by one. It should be noted that for the convenience of description, in the exemplary scenario and subsequent second and third exemplary scenarios, a same threshold BLER_s is set for each of BFD-RSs. Those skilled in the art should understand that different thresholds may be set for the BFD-RSs.

In FIG. 4, point B indicates that a counter Counter$_{2\_0}$, corresponding to BFD-RS$_{2\text{-}0}$ and maintained by the determination unit 220, reaches a maximum count threshold MaxCount_Num$_{2\_0}$. Then, the determination unit 220 may determine that a beam failure event occurs on BFD-RS$_{2\text{-}0}$ (or a beam corresponding to BFD-RS$_{2\text{-}0}$) in a second reference signal set $q_{02}$ configured for TRP2. In an embodiment, the electronic device 200 may further determine a candidate beam having a high signal quality (such as a candidate beam having a highest RSRP) in the second candidate beam set configured for TRP2 through the determination unit 220.

Based on the determination by the determination unit 220, the electronic device 200 may transmit a beam failure recovery request to the base station through the requesting unit 230. The beam failure recovery request may indicate, for example, the beam failure reference signal BFD-RS$_{2-0}$ and a corresponding candidate beam.

Second Exemplary Scenario

Figure 5:
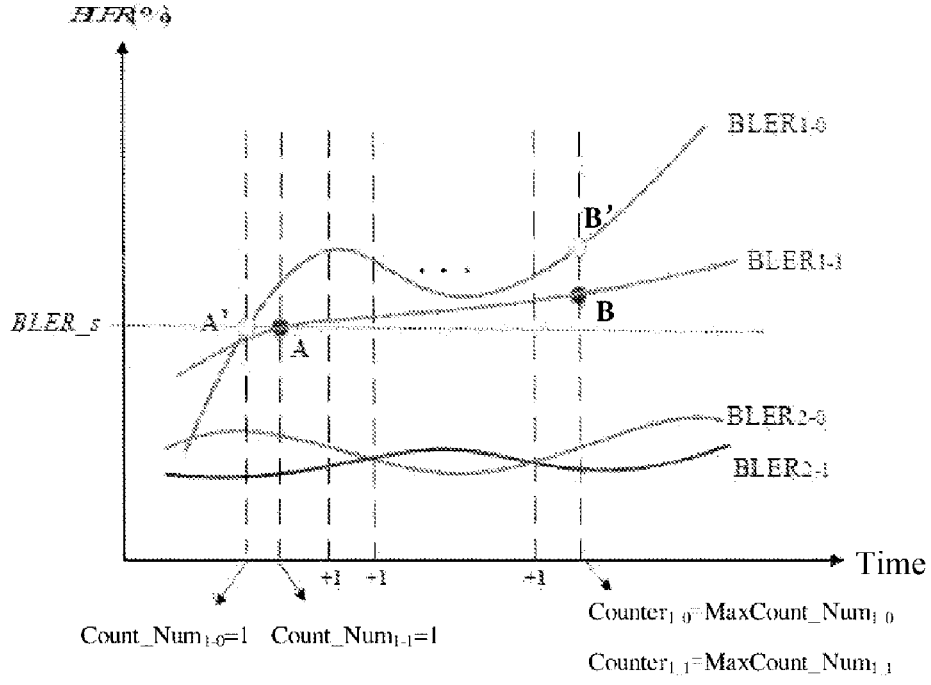
FIG. 5 is an explanatory diagram for explaining a second exemplary scenario in which an electronic device shown in FIG. 2 transmits a failure recovery request.

FIG. 5 schematically shows a schematic diagram of BLER curves measured based on reference signals in a second exemplary scenario in which an electronic device 200 transmits a failure recovery request.

Similar to point A in FIG. 4, points A and A' in FIG. 5 indicate that the electronic device 200 detects that BLERs respectively corresponding to BFD-RS$_{1-1}$ and BFD-RS$_{1-0}$ in a first reference signal set $q_{01}$ configured for TRP1 exceed a threshold BLER_s for a first time, and a value Count-_Num$_{1-1}$ of a corresponding counter Counter$_{1-1}$ and a value Count_Num$_{1-0}$ of a corresponding counter Counter$_{1-0}$ are incremented by one for a first time.

In addition, similar to point B in FIG. 4, points B and B' in FIG. 5 indicate that the value Count_Num$_{1-1}$ of the counter Counter$_{1-1}$ reaches a maximum count threshold MaxCount_Num$_{1-1}$ and the value Count_Num$_{1-0}$ of the counter Counter$_{1-0}$ reaches a maximum count threshold MaxCount_Num$_{1-0}$. Thus, the determination unit 220 may determine that a beam failure event occurs on BFD-RS$_{1-0}$ and BFD-RS$_{1-1}$ (or beams corresponding to BFD-RS$_{1-0}$ and BFD-RS$_{1-1}$) in the first reference signal set $q_{01}$ configured for TRP1. In an embodiment, the electronic device 200 may further determine a candidate beam having a high signal quality in the first candidate beam set configured for TRP1 through the determination unit 220. As an example, in a case that the first candidate beam set includes more than two candidate beams, the determination unit 220 may determine, for example, two candidate beams having a highest RSRP, and in a case that the first candidate beam set includes two candidate beams, the determination unit 220 may directly determine the two candidate beams as candidate beams.

Based on the determination by the determination unit 220, the electronic device 200 may transmit a beam failure recovery request to the base station through the requesting unit 230. The beam failure recovery request may indicate, for example, the beam failure reference signals BFD-RS$_{1-0}$ and BFD-RS$_{1-1}$ and corresponding candidate beams.

That is, in an embodiment, in a case that it is determined that a beam failure event occurs simultaneously on multiple reference signals, the electronic device 200 may, for example, transmit a beam failure recovery request indicating candidate beams corresponding to the reference signals through the requesting unit 230. With the above configuration, the electronic device can perform the beam failure recovery process only once, thereby reducing the signaling overhead.

Third Exemplary Scenario

Figure 6:
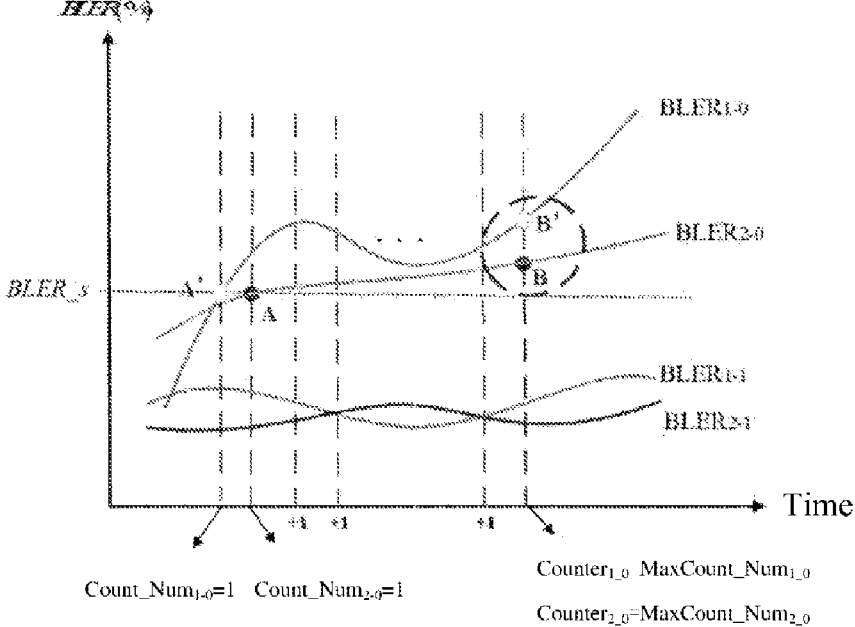
FIG. 6 is an explanatory diagram for explaining a third exemplary scenario in which an electronic device shown in FIG. 2 transmits a failure recovery request.

FIG. 6 schematically shows a schematic diagram of BLER curves measured based on reference signals in a third exemplary scenario in which an electronic device 200 transmits a failure recovery request.

Points A and A' in FIG. 6 are similar to the points A and A' in FIG. 5, and points B and B' in FIG. 6 are similar to the points B and B' in FIG. 5. Points A and A' in FIG. 6 indicate that BLER curves of reference signals BFD-RS$_{2-0}$ and BFD-RS$_{1-0}$ exceed the threshold BLER_s for a first time, so that, for example, the determination unit 220 respectively increments the value Count_Num$_{2-0}$ of the corresponding counter Counter$_{2-0}$ and the value Count_Num$_{1-0}$ of the corresponding counter Counter$_{1-0}$ by one for a first time. Points B and B' in FIG. 6 indicate that the value Count-_Num$_{2-0}$ of the counter Counter$_{2-0}$ reaches a maximum count threshold MaxCount_Num$_{2-0}$ and the value Count-_Num$_{1-0}$ of the counter Counter$_{1-0}$ reaches a maximum count threshold MaxCount_Num$_{1-0}$.

At a time instant corresponding to points B and B', the determination unit 220 may determine that a beam failure event occurs on BFD-RS$_{1-0}$ and BFD-RS$_{2-0}$. In addition, in an embodiment, the determination unit 220 may determine a candidate beam having a high signal quality in each of the candidate beam set of TRP1 and the candidate beam set of TRP2. As an example, the determination unit 220 may determine a candidate beam having a highest RSRP in the first beam set as a candidate beam for BFD-RS$_{1-0}$ and a candidate beam having a highest RSRP in the second candidate beam set as a candidate beam for BFD-RS$_{2-0}$.

Based on the determination by the determination unit 220, the electronic device 200 may transmit a beam failure recovery request to the base station through the requesting unit 230. The beam failure recovery request may indicate, for example, the beam failure reference signals BFD-RS$_{1-0}$ and BFD-RS$_{2-0}$ and corresponding candidate beams.

The difference between the examples shown in FIG. 6 and FIG. 5 is that, in the example shown in FIG. 6, the multiple reference signals (BFD-RS$_{1-0}$ and BFD-RS$_{2-0}$) on which the beam failure event occurs respectively belong to the first reference signal set and the second reference signal set, that is, the multiple reference signals respectively correspond to the first TRP and the second TRP. That is, the electronic device according to the embodiments, for example, may determine the beam failure events that occur at different TRPs through the determination unit 220, and transmits a beam failure recovery request for the beam failure events, thereby reducing the signaling overhead.

(2.1.3 Exemplary Manners in which a Beam Failure Recovery Request is Transmitted)

As described above, the electronic device 200 may, for example, divide the beam failure recovery request into different parts, such as a first part and a second part, through the requesting unit 230, and transmit the different parts in different steps/manners. In an embodiment, the electronic device 200 may transmit the beam failure recovery request in an appropriate manner based on the configuration information of the beam failure recovery request.

Hereinafter, exemplary manners in which a beam failure recovery request is transmitted are described.

First Exemplary Manner

In the first exemplary manner, the beam failure recovery request transmitted by the electronic device 200 through the requesting unit 230, for example, may include: a first part reporting a beam failure event and a second part indicating a beam failure reference signal and a corresponding candidate beam.

For example, the electronic device 200 may transmit a first part of the beam failure event to the base station by using the requesting unit 230 through a scheduling request (SR) from a physical layer to indicate the beam failure reference event to the base station and request uplink resources. The scheduling request herein is used for the beam failure recovery request, thus the scheduling request in this application may be called as a link recovery request (LRR). The scheduling request or the link recovery request may be triggered by the user equipment at any time and is transmitted to the base station side, providing a condition for the user equipment to report to the base station side timely after a beam failure occurs. After receiving a uplink (UL) grant transmitted by the base station based on the scheduling request through the reception unit 210, the electronic device 200, for example, may transmit the second part of the beam failure recovery request to the base station based on the requested (authorized) uplink resources (such as physical uplink shared channel (PUSCH) resources) to indicate the beam failure reference signal and the corresponding candidate beam. In an embodiment, the scheduling request adopted by the electronic device 200 may be pre-configured for the electronic device 200 by the base station. For example, the beam failure recovery configuration information received in advance by the electronic device 200 through the reception unit 210 may include configuration information about the beam failure recovery request. The configuration information about the beam failure recovery request may, for example, indicate an identification (SchedulingRequestID) of one or more scheduling requests configured for the electronic device. By using the one or more scheduling requests, the electronic device may transmit the first part of the beam failure recovery request to report the beam failure event to the base station and to request uplink resources for transmitting the second part of the beam failure recovery request. Since the configured scheduling request does not provide any information other than indicating the beam failure event, the configuration information about the beam failure recovery request in the embodiment may, for example, indicate an identification (SchedulingRequestID) of a scheduling request configured for the electronic device.

Thus, the electronic device 200 may transmit any scheduling request pre-configured by the base station through the reception unit 210 as the first part of the beam failure recovery request. As an example, the scheduling request may be transmitted through a PUCCH, and may be, for example, in a form of a bit sequence. Different values of the bit sequence may, for example, correspond to the IDs of different scheduling requests.

As an example, the electronic device 200 may transmit the second part of the beam failure recovery request indicating the beam failure reference signal and the corresponding candidate beam to the base station through a control element (MAC CE) of a media access layer through the requesting unit 230 based on uplink resources such as the uplink resources requested (authorized by the base station) through the scheduling request.

In an embodiment, the MAC CE as the second part of the beam failure recovery request may include first information indicating whether a beam failure event occurs on each of the reference signals included in each of the reference signal sets and second information indicating a candidate beam corresponding to the beam failure reference signal.

Figure 7:
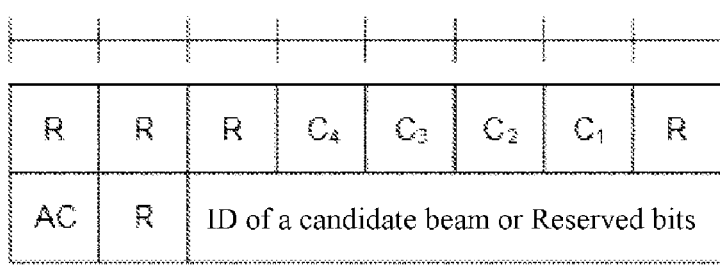
FIG. 7 is an explanatory diagram for explaining an exemplary format of a part of a beam failure recovery request transmitted by an electronic device shown in FIG. 2 through a MAC CE.

FIG. 7 schematically shows an exemplary format of a second part of a beam failure recovery request transmitted by an electronic device 200 using a MAC CE, for example, in an exemplary application scenario (in which two TRPs are arranged) shown in FIG. 3. A first octet (oct) in FIG. 7 is an example of the first information indicating whether the beam failure event occurs on each of reference signals BFD-RSs in each of the reference signal sets. $C_i$ (i=1,2,3, and 4) indicates whether a beam failure event occurs on an i-th BFD-RS of four BFD-RSs in uniformly numbered reference signals in two reference signal sets (for example, 1 indicates that a beam failure event occurs, and 0 indicates that no beam failure event occurs). R represents a reserved bit and, for example, may be set to 0.

The remaining octets (octs) in FIG. 7 are an example of the second information indicating a candidate beam corresponding to the beam failure reference signal. In each of the octets, AC is equal to 0 or 1 to indicate whether candidate beam information corresponding to the octet exists. For example, in a case that AC is equal to 1, it indicates that the information exists, then an index (an ID of a candidate beam) of a corresponding candidate beam is indicated in six bits after the reserved bit R; and in a case that AC is equal to 0, it indicates that the information does not exist, then six reserved bits (such as an all-zero bit sequence) are transmitted in the six bits after the reserved bit R. The number of the octets may correspond to the number of the BFD-RS on which a beam failure occurs. Each of the octets is configured to indicate candidate beam information of a BFD-RS on which a beam failure event occurs. For example, all candidate beams in each of the candidate beam sets may be coded in advance, for example, four candidate beams in two candidate beam sets may be coded uniformly as {000001} to {000011}, and the rest bits are reserved bits. In this example, the beam failure event may simultaneously occur at most on all four BFD-RSs. Therefore, up to four octets may be included.

Figure 8:
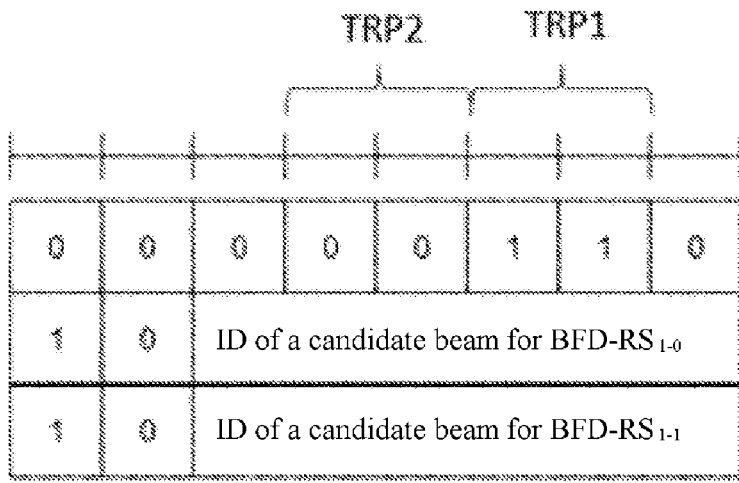
FIG. 8 is an explanatory diagram for explaining an exemplary MAC CE transmitted in an exemplary format shown in FIG. 7 in an example shown in FIG. 5.

For ease of understanding, FIG. 8 schematically shows an exemplary MAC CE transmitted in an exemplary format shown in FIG. 7 in an example shown in FIG. 5. In the exemplary scenario, a beam failure event simultaneously occurs on $BFD-RS_{1-0}$ and $BFD-RS_{1-1}$ in a first reference signal set $q_{01}$ of TRP1. Therefore, in the exemplary MAC CE shown in FIGS. 8, $C_1$ and $C_2$ respectively corresponding to $BFD-RS_{1-0}$ and $BFD-RS_{1-1}$ in the first octet are both 1, indicating that a beam failure event occurs on the two BFD-RSs; and $C_3$ and $C_4$ respectively corresponding to $BFD-RS_{2-0}$ and $BFD-RS_{2-1}$ in a second reference signal set $q_{02}$ of TRP2 are both 0, indicating that no beam failure event occurs on the two BFD-RSs. Next two octets in FIG. 8 are successively associated with $BFD-RS_{1-0}$ and $BFD-RS_{1-1}$ on which the beam failure event occurs. For each of the two octets, a first AC bit is set to 1 to indicate that information about a candidate beam exists, and last six bits indicate an ID of a candidate beam for $BFD-RS_{1-0}$ or an ID of a candidate beam for $BFD-RS_{1-1}$.

Second Exemplary Manner

In the second exemplary manner, the beam failure recovery request transmitted by the electronic device 200 through the requesting unit 230, for example, may include: a first part indicating a beam failure reference signal and a second part indicating a corresponding candidate beam.

For example, the electronic device 200 may transmit a first part of the beam failure event to the base station by using the requesting unit 230 through a scheduling request (SR) from a physical layer to indicate the beam failure reference event to the base station and request uplink resources. In an embodiment, the scheduling request transmitted by the electronic device 200 may be associated with a beam failure reference signal. After receiving a uplink (UL) grant transmitted by the base station based on the scheduling request through the reception unit 210, the electronic device 200, for example, may transmit the second part of the beam failure recovery request to the base station based on the requested (authorized) uplink resources (such as PUSCH resource) to indicate the candidate beam corresponding to the beam failure reference signal.

In an embodiment, the scheduling request adopted by the electronic device 200 may be pre-configured for the electronic device 200 by the base station. For example, the beam failure recovery configuration information received in advance by the electronic device 200 through the reception unit 210 may include configuration information about the beam failure recovery request. The configuration information about the beam failure recovery request may include, for example, configuration information associating multiple scheduling requests with the reference signals BFD-RSs in the reference signal sets. For example, the configuration information may indicate an association between identifications (ScheduledRequestIDs) of multiple scheduling requests configured for the electronic device and BFD-RSs. Through a scheduling request, the electronic device may transmit the first part of the beam failure recovery request to indicate to the base station that a beam failure event occurs on a reference signal associated with the scheduling request, and may request to the base station uplink resources for transmitting the second part of the beam failure recovery request. For example, in the exemplary application shown in FIG. 5, four BFD-RSs exist, and the base station may pre-configure four corresponding scheduling requests of SR0, SR1, SR2 and SR3 to indicate that a beam failure event occurs on a corresponding BFD-RS. That is, the configuration information about the beam failure recovery request may indicate a one-to-one correspondence relationship or an association between SR0, SR1, SR2 and SR3 and $BFD\text{-}RS_{1\text{-}0}$, $BFD\text{-}RS_{1\text{-}1}$, $BFD\text{-}RS_{2\text{-}0}$ and $BFD\text{-}RS_{2\text{-}1}$.

Thus, in a case that it is determined by the determination unit 230, for example, that a beam failure event occurs, that is, that a beam failure reference signal is determined, the electronic device 200 may transmit the first part of the beam failure recovery request through a scheduling request associated with the beam failure reference signal based on the configuration information about the beam failure recovery request. As an example, the scheduling request may be transmitted through a PUCCH, and may be, for example, in a form of a bit sequence. Different values of the bit sequence may, for example, correspond to the IDs of different scheduling requests.

As a manner in which the scheduling request is transmitted, for example, all scheduling requests (IDs of all scheduling requests) associated with all reference signals in the reference signal sets may be uniformly coded in advance as, for example, {001} to {011}, and the rest bits are reserved bits (considering that an all-zero bit sequence may be used as reserved bits, it is required to transmit a non-zero sequence as a valid scheduling request). For example, in the exemplary application shown in FIG. 5, when a beam failure event occurs on $BFD\text{-}RS_{1\text{-}0}$ in the first reference signal set $q_{01}$ of $TRP_1$, the electronic device 200 may transmit a corresponding scheduling request SR0, for example, in a format of {001}. For example, when a beam failure event occurs on $BFD\text{-}RS_{2\text{-}1}$ in the second reference signal set $q_{02}$ of TRP2, the electronic device 200 may transmit a corresponding scheduling request SR3, for example, in a format of {011}. When the beam failure event simultaneously occurs on multiple BFD-RSs, for example, multiple corresponding scheduling requests may be transmitted. In a case that the base station, for example, continuously receives multiple scheduling requests in a time period, the base station may determine that the beam failure event simultaneously occurs on multiple BFD-RSs, and uniformly allocate uplink resources.

As an example, the electronic device 200 may transmit the second part of the beam failure recovery request to the base station through a control element (MAC CE) from a media access layer or an aperiodic channel status information report (aperiodic CSI report) through the requesting unit 230 using the uplink resources (such as PUSCH resources) requested by using the above scheduling request (authorized by the base station) to indicate the candidate beam of the beam failure reference signal.

For example, the MAC CE or the aperiodic CSI report for transmitting the second part of the beam failure recovery request may directly include identification information of the candidate beam of the beam failure reference signal. Hereinafter, an exemplary format of the MAC CE and an exemplary format of the aperiodic CSI report are to be described respectively with reference to FIGS. 9 to 10 and FIGS. 11 to 12.

Figure 9:
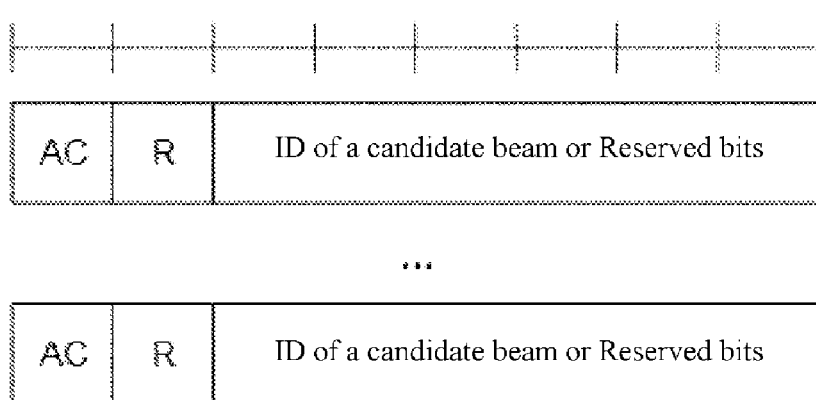
FIG. 9 is an explanatory diagram for explaining another exemplary format of a part of a beam failure recovery request transmitted by an electronic device shown in FIG. 2 through a MAC CE.

Reference is made to FIG. 9, which schematically shows an exemplary format of a second part of a beam failure recovery request transmitted by an electronic device 200 using a MAC CE, for example, in an exemplary application scenario (including two TRPs) shown in FIG. 3, in a case that the second part of the beam failure recovery request indicates a candidate beam.

In each of the octets shown in FIG. 9, AC is equal to 0 or 1 to indicate whether candidate beam information corresponding to the octet exists. For example, in a case that AC is equal to 1, it indicates that the information exists, then an index (an ID of a candidate beam) of a corresponding candidate beam is indicated in six bits after the reserved bit R; and in a case that AC is equal to 0, it indicates that the information does not exist, then six reserved bits (such as an all-zero bit sequence) are transmitted in the six bits after the reserved bit R. For example, all candidate beams in each of the candidate beam sets may be coded in advance, for example, four candidate beams in two candidate beam sets may be coded uniformly as {000001} to {000011}, and the rest bits are reserved bits. The number of the octets may correspond to the number of the BFD-RS (beam failure reference signal) on which a beam failure occurs. Each of the octets is configured to indicate candidate beam information of a BFD-RS on which a beam failure event occurs. In this example, the beam failure event may simultaneously occur at most on all four BFD-RSs. Therefore, up to four octets may be included.

Figure 10:
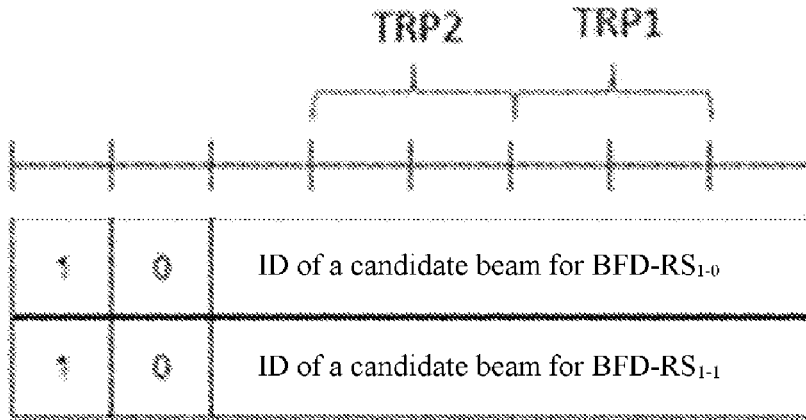
FIG. 10 is an explanatory diagram for explaining an exemplary MAC CE transmitted in an exemplary format shown in FIG. 9 in an example shown in FIG. 5.

For ease of understanding, FIG. 10 schematically shows an exemplary MAC CE transmitted in an exemplary format shown in FIG. 9 in an example shown in FIG. 5. In the exemplary scenario, a beam failure event simultaneously occurs on $BFD\text{-}RS_{1\text{-}0}$ and $BFD\text{-}RS_{1\text{-}1}$ in a first reference signal set $q_{01}$ of TRP1. Therefore, in the exemplary MAC CE shown in FIG. 10, two octets are successively associated with $BFD\text{-}RS_{1\text{-}0}$ and $BFD\text{-}RS_{1\text{-}1}$ on which the beam failure event occurs. For each of the two octets, a first AC bit is set to 1 to indicate that information about a candidate beam exists, and last six bits indicate an ID of a candidate beam for $BFD\text{-}RS_{1\text{-}0}$ or an ID of a candidate beam for $BFD\text{-}RS_{1\text{-}1}$.

Figure 11:
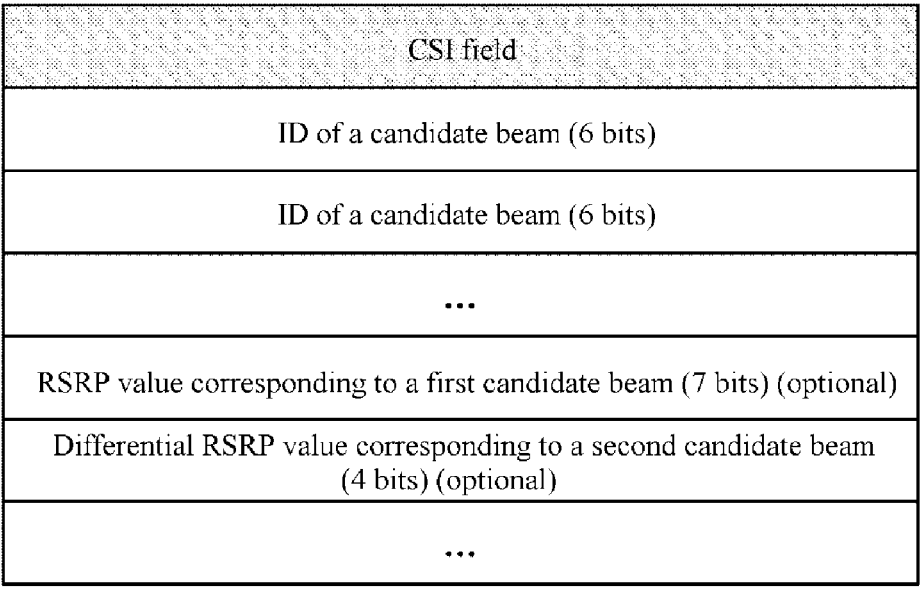
FIG. 11 is an explanatory diagram for explaining an exemplary format of a part of a beam failure recovery request transmitted by an electronic device shown in FIG. 2 through a CSI report.
Figure 12:
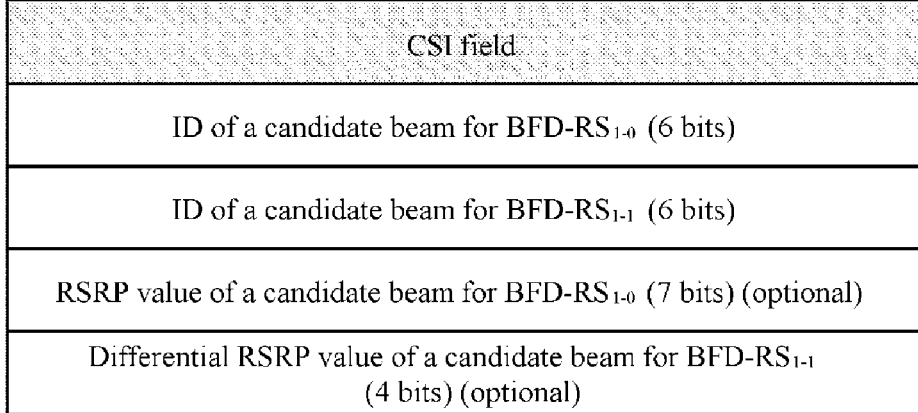
FIG. 12 is an explanatory diagram for explaining an exemplary CSI report transmitted in an exemplary format shown in FIG. 11 in an example shown in FIG. 5.

Reference is made to FIG. 11, which schematically shows an exemplary format of a second part of a beam failure recovery request transmitted by an electronic device 200 using an aperiodic CSI report, for example, in an exemplary application scenario (including two TRPs) shown in FIG. 3, in a case that the second part of the beam failure recovery request indicates a candidate beam.

A CSI field of an exemplary CSI report shown in FIG. 11 may include two parts. A first part includes first several (up to 4) fields (each of the fields may, for example, include 6 bits) for indicating identification information (an ID of a candidate beam) of a candidate beam of a BFD-RS on which a beam failure event occurs. For example, all candidate beams in each of the candidate beam sets may be coded in advance, for example, four candidate beams in two candidate beam sets may be coded uniformly as {000001} to {000011}, and the rest bits are reserved bits. In this example, the beam failure event may simultaneously occur at most on all four BFD-RSs. Therefore, the first part of CSI may include up to four such fields.

The second part of the exemplary CSI field shown in FIG. 11 is optional. Several (for example, up to 4) fields (each of the fields may, for example, include 7 bits) after the first part of the exemplary CSI field are configured to successively represent RSRPs of the candidate beams indicated in the first part. A first RSRP may correspond to a first candidate beam in the first part. The next one or more RSRPs may be differential RSRPs corresponding to the second or more candidate beams in the first part, indicating differences between the RSRPs of the candidate beams and the RSRP of the first candidate beam in the first part.

For ease of understanding, FIG. 11 schematically shows a CSI field of an exemplary CSI report transmitted in an exemplary format shown in FIG. 11 in an example shown in FIG. 5. In the exemplary scenario, a beam failure event simultaneously occurs on $BFD-RS_{1-0}$ and $BFD-RS_{1-1}$ in a first reference signal set $q_{01}$ of TRP1. Therefore, in the exemplary CSI field shown in FIG. 11, two fields in the first part successively indicate identifications (IDs of candidate beams) of candidate beams of $BFD-RS_{1-0}$ and $BFD-RS_{1-1}$ on which the beam failure event occurs, and two fields in the second part successively indicate RSRPs of the candidate beams.

[2.2 Configuration Examples of an Electronic Device at a Base Station Side]

Corresponding to the above configuration examples of the electronic device at the user equipment side, configuration examples of the electronic device at the base station side according to the embodiments of the present disclosure are to be described in detail below.

(2.2.1 Configuration Examples)

Figure 13:
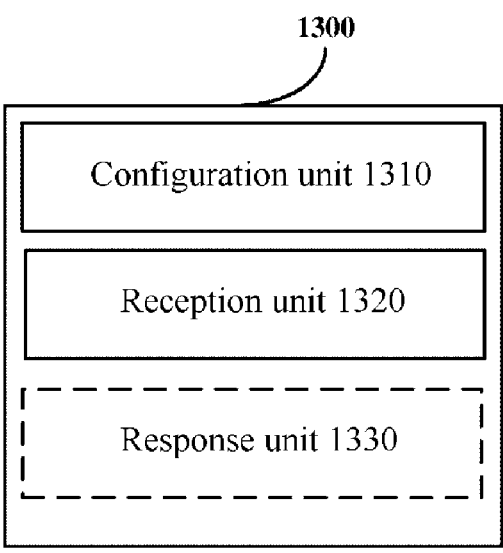
FIG. 13 shows a block diagram of a configuration example of an electronic device at a base station side according to an embodiment of the present disclosure.

FIG. 13 is a block diagram showing a configuration example of an electronic device at a base station side according to an embodiment of the present disclosure.

As shown in FIG. 13, an electronic device 1300 may include a configuration unit 1310, a reception unit 1320, and an optional response unit 1330.

All the units of the electronic device 1300 may be included in processing circuitry. It should be noted that the electronic device 1300 may include one processing circuitry or multiple processing circuitry. Further, the processing circuitry may include various discrete functional units to perform various functions and/or operations. It should be noted that the functional units may be physical entities or logical entities, and units with different titles may be implemented by the same physical entity.

In addition, an example in which the electronic device 1300 is the base station itself is described herein. However, it should be understood by those skilled in the art that the electronic device 1300 may also be implemented as an electronic device that has the functions of the configuration unit 1310, the reception unit 1320, and the optional response unit 1330 and, for example, is connected to a base station or communicates with a base station.

According to an embodiment of the present disclosure, the configuration unit 1310 may be configured to provide beam failure recovery configuration information to a user equipment. The beam failure recovery configuration information includes configuration information of a first reference signal set of a first transmission and reception point and configuration information of a second reference signal set of a second transmission and reception point, each of the first reference signal set and the second reference signal set includes one or more reference signals, so that the user equipment determines a beam failure reference signal on which a beam failure event occurs based on measured signal qualities of the reference signals included in each of the first reference signal set and the second reference signal set.

Next, corresponding to the configuration examples of the electronic device at the user equipment side, further details of the processing performed by the electronic device 1300 at the base station side and the units of the electronic device 1300 are explained in combination with the example shown in FIG. 3.

In the example shown in FIG. 3, the configuration unit 1310 of the electronic device 1300, for example, configures a first reference signal set $q_{01}$={$BFD-RS_{1-0}$, $BFD-RS_{1-1}$} and a second reference signal set $q_{02}$={$BFD-RS_{2-0}$, $BFD-RS_{2-1}$} for beam failure detection respectively for the first TRP and the second TRP, that is, TRP1 and TRP2.

As an example, it is shown that each of the reference signal sets includes two reference signals. However, the embodiment is not limited to the example. The number of reference signals in each of the reference signal sets is configured by the electronic device 1300, and is appropriately configured by the electronic device 1300 based on the capabilities of the user equipment, for example, through the configuration unit 1310. The reference signal (BFD-RS) used for beam failure detection in the reference signal set, for example, may be a non-periodic CSI-RS signal.

In an embodiment, in an exemplary application such as that shown in FIG. 3, before the user equipment UE receives the reference signal sets from the TRPs, the configuration unit 1310 may transmit beam failure recovery configuration information to the user equipment in advance, for example, through a radio resource control (RRC) signaling. That is, in the exemplary scenario according to the embodiment of the present disclosure, the electronic device 1300 at the base station side may pre-configure a reference signal set for each of the TRPs through the configuration unit 1310, and provide configuration information about the reference signal set to the user equipment. The beam failure recovery configuration information may include, for example, configuration information of the first reference signal set ($q_{01}$) of the first transmission and reception point (TRP1) and configuration information of the second reference signal set ($q_{02}$) for the second transmission and reception point (TRP2). The configuration information of the reference signal sets may include, for example, information for indicating each of reference signal BFD-RS in each of the reference signal sets. As an example, the configuration information may include an index of each of the BFD-RSs (such as periodic CSI-RSs). In addition, the electronic device 1300 may further provide configuration information about a reference signal set to a corresponding TRP through the configuration unit 1310, so that the TRP may transmit a reference signal in the reference signal set for the user equipment to perform beam failure detection, which is not repeated herein.

In addition, in an embodiment, the beam failure recovery configuration information may further include, for example, configuration information of a criteria for a beam failure event. The configuration information of the criteria for the beam failure event may include, for example, but is not limited to: configuration information indicating a signal quality threshold for determining that a beam failure instance occurs on a BFD-RS (such as a Block Error Rate (BLER) threshold BLER_s), where the BLER_s, as the signal quality threshold, may be configured separately for each of the BFD-RSs or be configured uniformly; configuration information (for example, including an initial value, such as 0, of a counter and a maximum count threshold for determining a beam failure event) about a counter that is individually configured for each of the BFD-RSs and used for counting beam failure instances; and the like.

In an embodiment, the beam failure recovery configuration information may further include, for example, configuration information of a first candidate beam set ($q_{11}$) of the first transmission and reception point (TRP1) and configuration information of a second candidate beam set ($q_{12}$) of the second transmission and reception point (TRP2). That is, in the exemplary scenario according to the embodiment of the present disclosure, the electronic device 1300 at the base station side may pre-configure a candidate beam set for each of the TRPs through the configuration unit 1310. Each of candidate beam sets may include one or more candidate beams. The electronic device 1300 may transmit the configuration information about the candidate beam sets to the user equipment in advance through the configuration unit 1310. As an example, the configuration information may include an index of a reference signal such as a periodic CSI-RS and/or a SSB corresponding to each of candidate beams in each of the candidate beam sets. In addition, the electronic device 1300 may further provide configuration information about a corresponding candidate beam set to a corresponding TRP through the configuration unit 1310, so that the TRP may transmit a candidate beam for the user equipment to perform detection to determine a candidate beam according to requirements, which is not repeated herein.

In addition, in an embodiment, the beam failure recovery configuration information may further include, for example, configuration information about a criteria for determining a candidate beam. The configuration information about the criteria for determining the candidate beam may include, for example, configuration information indicating a signal quality threshold (such as a reference signal receive power (RSRP) threshold) for determining the candidate beam.

In an embodiment, the beam failure recovery configuration information may further include, for example, configuration information about a beam failure recovery request to be transmitted by the user equipment. The configuration information about the beam failure recovery request may include, for example, information (such as, information indicating an identification of a scheduling request) indicating a scheduling request that may be at least a part of the beam failure recovery request, information for associating a scheduling request that may be at least a part of the beam failure recovery request with a beam failure reference signal, and the like. With the configuration information of the beam failure recovery request, for example, the user equipment having received the configuration information may transmit a beam failure recovery request in a corresponding manner based on the configuration information, as described in the above "Exemplary manners in which a beam failure recovery request is transmitted" part in the configuration examples at the user equipment side.

In addition, in an embodiment, the beam failure recovery configuration information may further include configuration information about a priority of a beam failure recovery request, such as configuration information indicating that a priority of the beam failure recovery request is configured to be higher than a priority of a hybrid automatic retransmission request. With the configuration information about the priority of the beam failure recovery request, the user equipment having received the configuration information, for example, in a case that a beam failure recovery request or at least a part (such as a scheduling request described in detailed later) of the beam failure recovery request transmitted through a PUCCH collides with a hybrid automatic retransmission request, may preferentially transmit the beam failure recovery request and, for example, discard the hybrid automatic retransmission request, and then transmits the hybrid automatic retransmission request at a later appropriate time instant.

The user equipment receiving the beam failure configuration information may correspondingly monitor the BFD-RSs in each of the reference signal sets from each of the TRPs to determine a beam failure reference signal, and optionally determine a candidate beam in a pre-configured candidate beam set from a TRP corresponding to a reference signal set to which the beam failure reference signal belongs. The user equipment may transmit a beam failure recovery request (BFRQ) to the electronic device 1300 at the base station side in a case that it is determined that a beam failure event occurs on at least one reference signal.

The electronic device 1300 may receive, for example, through the reception unit 1320, a beam failure recovery request from the user equipment in a case that it is determined that a beam failure event occurs on at least one reference signal. The beam failure recovery request received by the electronic device 1300 from the user equipment may indicate, for example, a beam failure event, a beam failure reference signal, and/or a corresponding candidate beam.

In an embodiment, the beam failure recovery request received by the reception unit 1320 of the electronic device 1300 at the base station side may be divided into different parts, such as a first part and a second part. The reception unit 1320 may receive the different parts from the user equipment in different steps. For example, the electronic device 1300 may receive the first part of the beam failure recovery request from the user equipment through a scheduling request (SR) from a physical layer through the reception unit 1320. With the scheduling request, the electronic device 1300 may be requested to allocate uplink resources for transmitting the second part. The electronic device 1300 may transmit information about authorized uplink resource (UL grant) to the user equipment through the optional response unit 1330, and may receive the second part of the beam failure recovery request from the electronic device using the uplink resources (such as PUSCH resources) through the reception unit 1320. Corresponding to the "Exemplary manners in which a beam failure recovery request is transmitted" described in the configuration examples at the user equipment side above, the electronic device 1300 at the base station side may receive the different parts from the user equipment in different steps, which is to be further described in the "Examples of a received beam failure recovery request" part.

For the beam failure recovery request received from the user equipment, the electronic device 1300 at the base station side may transmit a corresponding response message or a corresponding confirmation message to the user equipment through the optional response unit 1330, so that the user equipment may perform subsequent beam failure recovery processing based on the response message or the confirmation message. For example, in a case that the beam failure recovery request from the user equipment includes information indicating a candidate beam, the response message or the confirmation message from the electronic device 1300 at the base station side confirms the candidate beam, so that the user equipment may replace the beam failure reference signal with the candidate beam based on the response message or the confirmation message as a reference information BFD-RS in the corresponding reference signal set, and then the user equipment may, for example, perform appropriate subsequent processing in a manner according to the conventional technology. In addition, the electronic device 1300 may further transmit a message to the corresponding TRP through the response unit 1330, so that the TRP may replace the reference signal on which a beam failure event occurs in the reference signal set with the corresponding candidate beam, which is not repeated herein.

The configuration examples of the electronic device at the base station side according to the embodiments of the present disclosure are described above. As described above, for the multi TRP scenario, the electronic device at the base station side according to the embodiments of the present disclosure may configured a reference signal set for each of the TRPs, and may provide the user equipment with corresponding beam failure recovery configuration information, so that the user equipment may perform beam failure detection based on the reference signal set separately configured for each of the TRPs. In addition, a beam failure recovery process can be triggered when a beam failure occurs on some (at least one) of reference signals in the reference signal set, thereby avoiding the performance degradation caused by ignoring beam failures on some TRPs according to the conventional technology.

Hereafter, in combination with an exemplary application shown in FIG. 3, exemplary scenarios in which an electronic device 1300 at the base station side receives a beam failure recovery request and examples of a received beam failure recovery request are briefly described.

(2.2.2 Exemplary Scenarios in which a Beam Failure Recovery Request is Received)

Corresponding to the first exemplary scenario to the third exemplary scenario described in the part of "Exemplary scenarios in which a beam failure recovery request is transmitted" in the configuration examples of the electronic device on the user equipment side previously in combination with FIGS. 4 to 6, the exemplary scenarios of the electronic device 1300 receiving a beam failure recovery request may include three corresponding exemplary scenarios, for example, an exemplary scenario in which a beam failure event occurs on only one BFD-RS, an exemplary scenario in which a beam failure event simultaneously occurs on multiple BFD-RSs of a same TRP, and an exemplary scenario in which a beam failure event simultaneously occurs on multiple BFD-RSs of different TRPs. Therefore, the beam failure recovery request received by the electronic device 1300 may indicate, for example, one or more beam failure reference signals and corresponding candidate beams.

In an embodiment, when the electronic device 1300 receives a beam failure recovery request from the user equipment indicating candidate beams of multiple reference signals on which the beam failure event simultaneously occurs, for example, through the reception unit 1310, the electronic device 1300 may transmit a response message to the user equipment through the response unit 1330 to confirm the candidate beams indicated by the beam failure recovery request. The multiple reference signals on which the beam failure event occurs may belong to a same reference signal set, or may respectively belong to the first reference signal set and the second reference signal set. With the above configuration, the user equipment can perform the beam failure recovery process only once, thereby reducing the signaling overhead.

(2.2.3 Examples of a Received Beam Failure Recovery Request)

As mentioned above, the beam failure recovery configuration information provided by the electronic device 1300 at the base station side for the user equipment, for example, through the configuration unit 1310, may include, for example, the configuration information of the beam failure recovery request to be transmitted by the user equipment. With the configuration information, for example, the user equipment having received the configuration information may transmit a beam failure recovery request in a corresponding manner based on the configuration information as described previously in the "Exemplary manners in which a beam failure recovery request is transmitted" part of the configuration examples of the electronic device at the user equipment side. Accordingly, the electronic device 1300 at the base station side may receive the beam failure recovery request from the user equipment in a corresponding manner.

That is, corresponding to the first exemplary manner and the second exemplary manner described in the "Exemplary manners in which a beam failure recovery request is transmitted" part of the configuration examples of the electronic device at the user equipment side in combination with FIGS. 7 to 12, the beam failure recovery request received by the electronic device 1300 may be transmitted by the user equipment in different manners, and the transmission manners are optionally related to the beam failure request configured for the user equipment by the electronic device 1300.

For example, in the first exemplary manner, the beam failure recovery request received by the electronic device 1300 from the user equipment through the reception unit 1310, for example, may include: the first part reporting the beam failure event and the second part indicating the beam failure reference signal and the corresponding candidate beam.

For example, the electronic device 1300 may receive the first part of the beam failure event transmitted by the user equipment through the scheduling request (SR) from the physical layer through the reception unit 1320, where the first part is transmitted for indicating the beam failure reference signal event and requesting uplink resources. The scheduling request or the link recovery request may be triggered by the user equipment at any time and is transmitted to the electronic device 1300 at the base station side, providing a condition for the user equipment to report to the base station side timely after a beam failure occurs. After receiving the scheduling request, the electronic device 1300 may authorize uplink resources (such as PUSCH) to the user equipment through the response unit 1330, and transmit an uplink grant (UL grant) to the user equipment, so that the user equipment may transmit the second part of the beam failure recovery request to the electronic device 1300 at the base station based on the authorized uplink resources to indicate the beam failure reference signal and the corresponding candidate beam.

In an embodiment, the scheduling request adopted by the user equipment may be pre-configured by the electronic device 1300 through the configuration unit 1310. For example, the beam failure recovery configuration information provided by the electronic device 1300 to the user equipment in advance through the configuration unit 1310 may include configuration information about the beam failure recovery request. The configuration information about the beam failure recovery request may, for example, indicate an identification (SchedulingRequestID) of one or more scheduling requests configured for the user equipment. By using the one or more scheduling requests, the user equipment may transmit the first part of the beam failure recovery request to report the beam failure event to the electronic device 1300 at the base station side and to request uplink resources for transmitting the second part of the beam failure recovery request. Since the configured scheduling request does not provide any information other than indicating the beam failure event, the configuration information about the beam failure recovery request in the embodiment may, for example, indicate an identification (SchedulingRequestID) of a scheduling request configured for the electronic device.

Thus, the user equipment may transmit any scheduling request pre-configured by the electronic device 1300 at the base station side as the first part of the beam failure recovery request. As an example, the scheduling request may be transmitted through a PUCCH, and may be, for example, in a form of a bit sequence. Different values of the bit sequence may, for example, correspond to the IDs of different scheduling requests.

As an example, the second part of the beam failure recovery request received by the electronic device 1300 from the user equipment may be transmitted by the user equipment using the uplink resources (such as the PUSCH resources) requested (authorized by the electronic device 1300 at the base station side) by using the scheduling request and through a control element (MAC CE) of a media access layer, and the second part is configured to indicate the beam failure reference signal and the corresponding candidate beam.

In an embodiment, the MAC CE received by the electronic device 1300 as the second part of the beam failure recovery request may include first information indicating whether a beam failure event occurs on each of the reference signals included in each of the reference signal sets and second information indicating a candidate beam corresponding to the beam failure reference signal. The MAC CE, for example, may have an exemplary format as shown in FIGS. 7 and 8, which is not repeated herein.

In addition, in the second exemplary manner, the beam failure recovery request received by the electronic device 1300 from the user equipment through the reception unit 1310, for example, may include: a first part indicating a beam failure reference signal and a second part indicating a corresponding candidate beam.

For example, the electronic device 1300 may receive the first part of the beam failure request transmitted by the user equipment through a scheduling request (SR) from a physical layer through the reception unit 1320, and the first part is transmitted for indicating the beam failure reference signal and requesting uplink resources. In an embodiment, the scheduling request received by the electronic device 1300 may be associated with a beam failure reference signal based on the configuration information of the beam failure request. After receiving a scheduling request, the electronic device 1300 may authorize an uplink resource PUSCH to the user equipment through the response unit 1330, and transmit an uplink grant (UL grant) to the user equipment, so that the user equipment may transmit the second part of the beam failure recovery request to the electronic device 1300 at the base station side based on the authorized uplink resources (such as PUSCH resource) to indicate a candidate beam corresponding to the beam failure reference signal.

As mentioned above, in an embodiment, the scheduling request adopted by the user equipment may be pre-configured by the electronic device 1300 through the configuration unit 1310. For example, the beam failure recovery configuration information provided by the electronic device 1300 to the user equipment in advance through the configuration unit 1310 may include configuration information about the beam failure recovery request. The configuration information about the beam failure recovery request may include, for example, configuration information associating multiple scheduling requests with the reference signals BFD-RSs in the reference signal sets. For example, the configuration information may indicate an association between identifications (ScheduledRequestIDs) of multiple scheduling requests configured for the user equipment and BFD-RSs. Through a scheduling request, the user equipment may transmit the first part of the beam failure recovery request to indicate to the electronic device 1300 at the base station side that a beam failure event occurs on a reference signal associated with the scheduling request, and request uplink resources for transmitting the second part of the beam failure recovery request. For example, in the exemplary application shown in FIG. 5, four BFD-RSs exist, and the electronic device 1300 at the base station side may pre-configure four corresponding scheduling requests of SR0, SR1, SR2 and SR3 to indicate that a beam failure event occurs on a corresponding BFD-RS. That is, the configuration information about the beam failure recovery request may indicate a one-to-one correspondence relationship or an association between SR0, SR1, SR2 and SR3 and $BFD\text{-}RS_{1\text{-}0}$, $BFD\text{-}RS_{1\text{-}1}$, $BFD\text{-}RS_{2\text{-}0}$ and $BFD\text{-}RS_{2\text{-}1}$.

Thus, in a case that it is determined by the user equipment, for example, that a beam failure event occurs, that is, that a beam failure reference signal is determined, the user equipment may transmit the first part of the beam failure recovery request through a scheduling request associated with the beam failure reference signal based on the configuration information about the beam failure recovery request. As an example, the scheduling request received by the electronic device 1300 at the base station side may be transmitted through a PUCCH, and may be, for example, in a form of a bit sequence. Different values of the bit sequence may, for example, correspond to the IDs of different scheduling requests.

As a manner in which the scheduling request is transmitted or received, for example, all scheduling requests (IDs of all scheduling requests) associated with all reference signals in each reference signal set may be uniformly coded in advance as, for example, {001} to {011}, and the rest bits are reserved bits (considering that an all-zero bit sequence may be used as reserved bits, it is required to transmit a non-zero sequences as a valid scheduling request). For example, in the exemplary application shown in FIG. 5, when a beam failure event occurs on $BFD\text{-}RS_{1\text{-}0}$ in the first reference signal set $q_{01}$ of $TRP_1$, the electronic device 1300 at the base station side may receive a scheduling request SR0, for example, in a format of {001}, corresponding to $BFD\text{-}RS_{1\text{-}0}$ from the user equipment. For example, when a beam failure event occurs on $BFD\text{-}RS_{2\text{-}1}$ in the second reference signal set $q_{02}$ of TRP2, the electronic device 1300 at the base station side may receive a scheduling request SR3, for example, in a format of {011}, corresponding to $BFD\text{-}RS_{2\text{-}1}$ from the user equipment. When the beam failure event simultaneously occurs on multiple BFD-RSs, the electronic device 1300 at the base station side may, for example, receive multiple corresponding scheduling requests. In a case that the electronic device 1300, for example, receives continuously multiple scheduling requests in a time period, the electronic device 1300 may determine that the beam failure event simultaneously occurs on multiple BFD-RSs, and uniformly allocate uplink resources.

As an example, the second part of the beam failure recovery request received by the electronic device 1300 may be transmitted by the user equipment through a control element (MAC CE) from a media access layer or an aperiodic channel status information report (aperiodic CSI report) using uplink resources (such as PUSCH resources) requested (authorized by the electronic device 1300 at the base station side) by using the scheduling request to indicate the candidate beam of the beam failure reference signal.

For example, the MAC CE or the aperiodic CSI report received by the electronic device 1300 as the second part of the beam failure recovery request may directly include identification information of the candidate beam of the beam failure reference signal. The MAC CE or the aperiodic CSI report may have an exemplary format described respectively with reference to FIGS. 9 to 10 or FIGS. 11 to 12, which is not repeated herein.

3. EXAMPLES OF AN INFORMATION INTERACTION PROCESS

Hereinafter, examples of an information interaction process according to an embodiment of the present disclosure are to be described with reference to FIG. 14.

Figure 14:
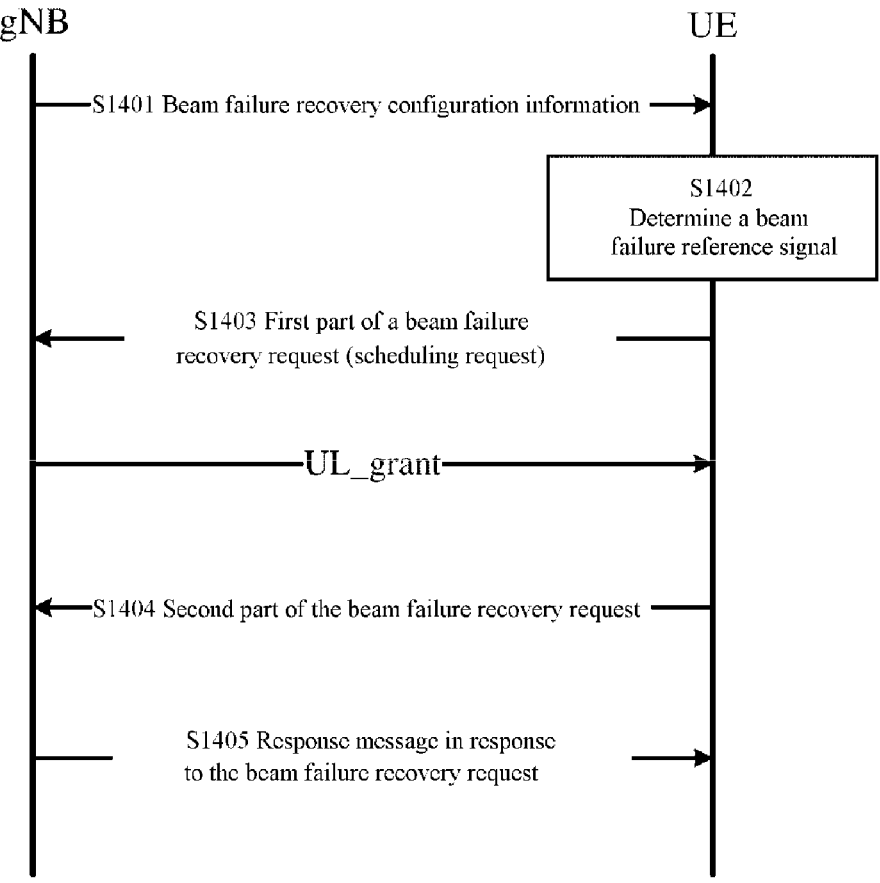
FIG. 14 is a schematic diagram showing an example of an information interaction process according to an embodiment of the present disclosure.

FIG. 14 is a schematic diagram showing an example of an information interaction process according to an embodiment of the present disclosure. In FIG. 14, a user equipment UE and a base station gNB are schematically shown, and multiple TRPs that may exist, such as TRP1 and TRP2, are omitted.

As shown in FIG. 14, in step S1401, the base station gNB provides the user equipment UE with beam failure recovery configuration information. The beam failure recovery configuration information may include, for example, configuration information of reference signal sets configured by gNB for TRP1 and TRP2 for beam failure detection. In an embodiment, the beam failure recovery configuration information may further include configuration information of candidate beam sets and configuration information of a criteria for determining a candidate beam that are configured by gNB for TRP1 and TRP2. In an embodiment, the beam failure recovery configuration information may further include one or more of configuration information about a criteria for determining a beam failure event, configuration information about a beam failure recovery request, and configuration information about a priority.

Next, in step S1402, the UE, for example, measures a signal quality of each of reference signals in each of the reference signal sets based on the received configuration information, and determines a beam failure reference signal on which a beam failure event occurs based on the measured signal quality. In step S1403, on determining that the beam failure event occurs on at least one reference signal, the UE transmits a first part of a beam failure recovery request to the gNB through a scheduling request. As an example, the scheduling request may only indicate a beam failure recovery event, or may directly indicate a beam failure reference signal.

In response to the scheduling request from the UE in step S1403, the gNB transmits an uplink grant UL_grant to the UE. In step S1404, the UE transmits a second part of the beam failure recovery request to the gNB based on uplink resources authorized by the UL_grant. As an example, in a case that the scheduling request in step S1403 only indicates a beam failure recovery event, the second part in step S1404 may indicate, for example, a beam failure reference signal and a corresponding candidate beam; and in a case that the scheduling request in step S1403 directly indicates a beam failure reference signal, the second part in step S1404 may, for example, indicate a corresponding candidate beam.

In step S1405, the gNB transmits a response message in response to the beam failure recovery request to confirm the candidate beam indicated by the beam failure recovery request in step S1404.

The exemplary flow shown in FIG. 14 may be performed by the electronic device 200 at the user equipment side and the electronic device 1300 at the base station side described above with reference to FIGS. 2 to 13. Therefore, the advantages and benefits described in the above configuration examples of the electronic devices can be obtained, and are not described herein.

4. METHOD EMBODIMENTS

Hereinafter, a method performed by the electronic device according to the embodiments of the present disclosure is to be described in detail. It should be noted that the implementations of the method correspond to the configuration examples of the apparatuses described above with reference to FIGS. 2 to 13. Therefore, the details and benefits of the above configuration examples of the apparatuses are appropriately applicable to the following method embodiments.

[4.1 Method Embodiments at a User Equipment Side]

Figure 15:
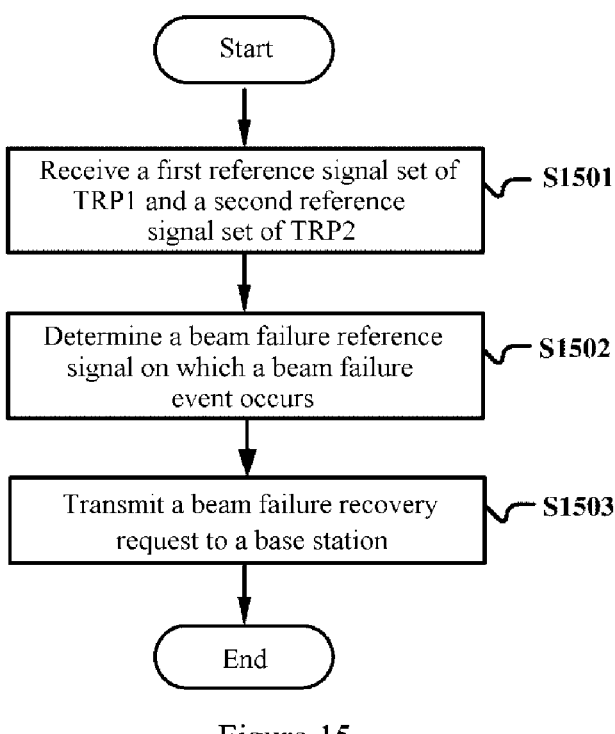
FIG. 15 is a flowchart showing an exemplary process of a wireless communication method at a user equipment side according to an embodiment of the present disclosure.

FIG. 15 is a flowchart showing an exemplary process of a wireless communication method at a user equipment side according to an embodiment of the present disclosure, which may be implemented, for example, by the electronic device 200 at the user equipment side described with reference to FIGS. 2 to 12.

As shown in FIG. 15, in a wireless communication method performed by an electronic device, for example, as a user equipment, firstly, in step S1501, a pre-configured first reference signal set from a first transmission and reception point (TRP1) and a pre-configured second reference signal set from a second transmission and reception point (TRP2) are received. Each of the first reference signal set and the second reference signal set includes one or more reference signals. Next, in step S1502, a beam failure reference signal on which a beam failure event occurs is determined based on measured signal qualities of the reference signals included in each of the first reference signal set and the second reference signal set. Next, in step S1503, a beam failure recovery request is transmitted to a base station in a case that it is determined that the beam failure event occurs on one or more reference signals.

As an example, in step S1503, in a case that it is determined that the beam failure event occurs on multiple reference signals, a beam failure recovery request indicating a candidate beam corresponding to each of the multiple reference signals may be transmitted.

In an embodiment, the multiple reference signals may respectively belong to the first reference signal set and the second reference signal set.

In an embodiment, although not shown in FIG. 15, the method may further include: determining a candidate beam in a pre-configured candidate beam set from a transmission and reception point corresponding to a reference signal set to which the beam failure reference signal belongs.

In an embodiment, the beam failure recovery request may include: a first part reporting the beam failure event and a second part indicating the beam failure reference signal and the corresponding candidate beam.

In an embodiment, in step S1503, the first part may be transmitted to the base station through a scheduling request from a physical layer to request uplink resources from the base station.

In an embodiment, in step S1503, based on the requested uplink resources, the second part may be transmitted to the base station through a media access control element.

As an example, the media access control element may include: first information indicating whether the beam failure event occurs on each of the reference signals comprised in each of the first reference signal set and the second reference signal set and second information indicating the candidate beam corresponding to the beam failure reference signal.

In an embodiment, the beam failure recovery request may include: a first part indicating the beam failure reference signal and a second part indicating the corresponding candidate beam.

In an embodiment, in step S1503, the first part may be transmitted to the base station through a scheduling request from a physical layer to request uplink resources from the base station.

As an example, the transmitted scheduling request may be associated with the beam failure reference signal.

In an embodiment, although not shown in FIG. 15, the method may further include: receiving beam failure recovery configuration information from the base station in advance. The beam failure recovery configuration information includes configuration information associating multiple scheduling requests with the reference signals included in each of the first reference signal set and the second reference signal set. In an embodiment, in step S1503, the first part may be transmitted through the scheduling request associated with the beam failure reference signal.

In an embodiment, in step S1503, based on the requested uplink resources, the second part may be transmitted to the base station through a media access control element or an aperiodic channel state information report.

As an example, the media access control element or the aperiodic channel state information report may include identification information of the candidate beam corresponding to the beam failure reference signal.

According to the embodiment of the present disclosure, the subject performing the above method may be the electronic device 200 according to the embodiments of the present disclosure. Therefore, various aspects of the electronic device 200 and the functional units of the electronic device 200 described in the above embodiments are applicable herein.

[4.2 Method Embodiments at a Base Station Side]

Figure 16:
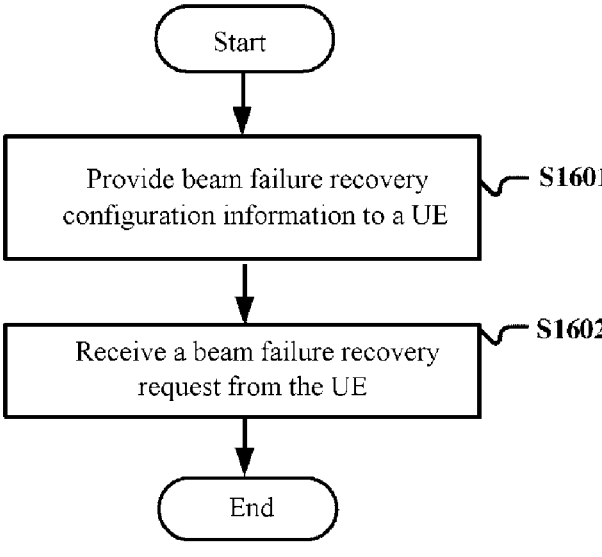
FIG. 16 is a flowchart showing an exemplary process of a wireless communication method at a base station side according to an embodiment of the present disclosure.

FIG. 16 is a flowchart showing an exemplary process of a wireless communication method at a base station side according to an embodiment of the present disclosure, which may be implemented, for example, by the electronic device 1300 at the base station side described with reference to FIGS. 13.

As shown in FIG. 16, in a wireless communication method performed by an electronic device, for example, as a base station, firstly, in step S1601, beam failure recovery configuration information is provided to a user equipment (UE). The beam failure recovery configuration information includes configuration information of a first reference signal set of a first transmission and reception point and configuration information of a second reference signal set of a second transmission and reception point, each of the first reference signal set and the second reference signal set includes one or more reference signals, so that the user equipment determines a beam failure reference signal on which a beam failure event occurs based on measured signal qualities of the reference signals included in each of the first reference signal set and the second reference signal set. Next, in step S1602, a beam failure recovery request is received from the user equipment (UE) in a case that it is determined that the beam failure event occurs on one or more reference signals.

As an example, in step S1602, after receiving a beam failure recovery request from the user equipment indicating a candidate beam corresponding to each of multiple reference signals on which the beam failure event occurs, a response message may be transmitted to the user equipment to confirm the candidate beam corresponding to each of the multiple reference signals indicated by the beam failure recovery request.

In an embodiment, the multiple reference signals may respectively belong to the first reference signal set and the second reference signal set.

In an embodiment, the beam failure recovery configuration information provided to the user equipment in step S1601 may further include configuration information of a first candidate beam set of the first transmission and reception point and configuration information of a second candidate beam set of the second transmission and reception point.

In an embodiment, the beam failure recovery configuration information may further include configuration information associating multiple scheduling requests with the reference signals included in each of the first reference signal set and the second reference signal set. In an embodiment, in step S1602, one or more parts of a beam failure recovery request transmitted by the user equipment through a scheduling request associated with the beam failure reference signal may be received.

In an embodiment, the beam failure recovery configuration information may further include configuration information indicating that a priority of the beam failure recovery request is configured to be higher than a priority of a hybrid automatic retransmission request.

According to the embodiment of the present disclosure, the subject performing the above method may be the electronic device 1300 according to the embodiments of the present disclosure. Therefore, various aspects of the electronic device 1300 and the functional units of the electronic device 1300 described in the above embodiments are applicable herein.

5. APPLICATION EXAMPLES

The technology according to the present disclosure may be applicable to various products.

For example, the electronic device 1300 may be implemented as various base stations, such as a macro eNB and a small eNB, and may be implemented as any type of gNB (a base station in a 5G system). The small eNB may be an eNB, such as a pico eNB, a micro eNB, and a home (femto) eNB, which covers a cell smaller than a macro cell. Alternatively, the base station may be implemented as any other type of base station, such as a NodeB and a base transceiver station (BTS). The base station may include: a body (which is also referred to as a base station device) configured to control wireless communications, and one or more remote wireless heads (RRHs) arranged in a different place from the body.

In addition, the electronic device 200 may be implemented as various user equipments. The user equipment may be implemented as a mobile terminal (such as a smart phone, a tablet personal computer (PC), a notebook PC, a portable game terminal, a portable/dongle type mobile router, and a digital camera) or a vehicle-mounted terminal (such as an automobile navigation device). The user equipment may also be implemented as a terminal (also referred to as a machine type communication (MTC) terminal) that performs machine-to-machine (M2M) communication. In addition, the user equipment may be a wireless communication module (such as an integrated circuit module including a single chip) installed on each of the above-mentioned user equipment.

Application Examples about Base Station

First Application Example

Figure 17:
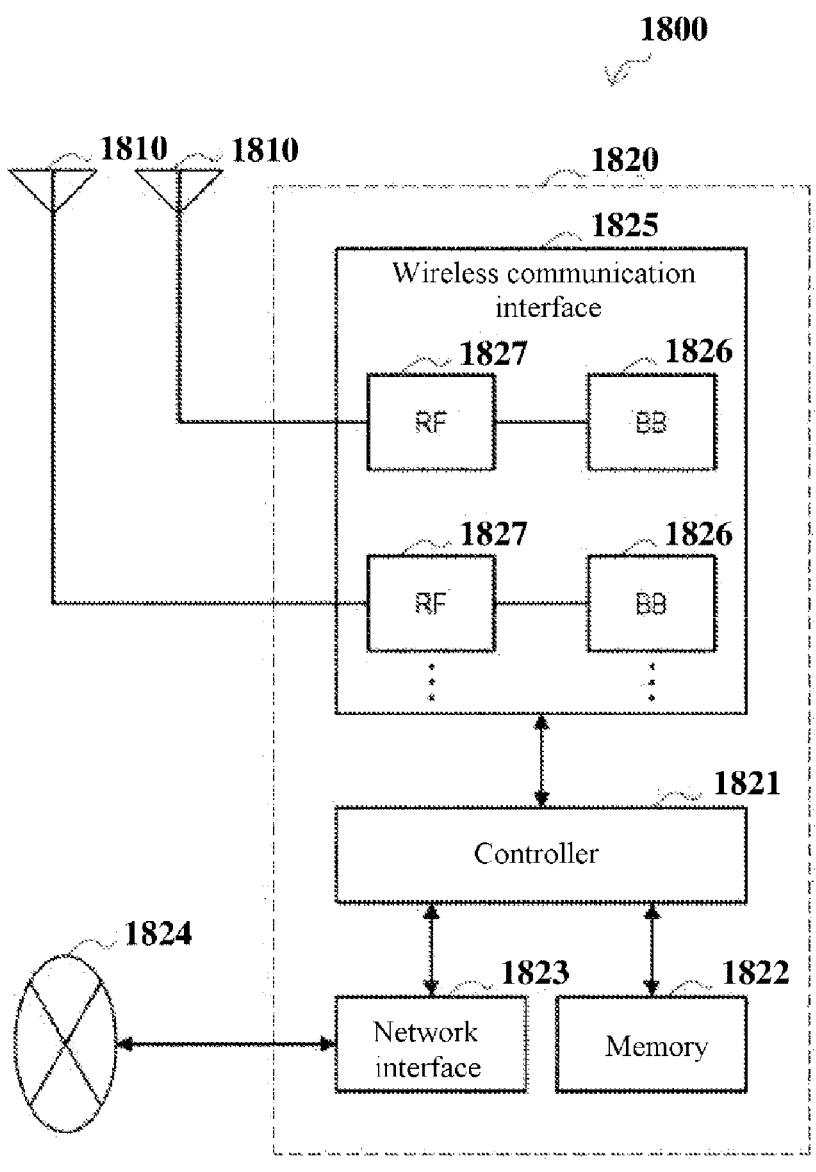
FIG. 17 is a block diagram showing a first example of a schematic configuration of an eNB to which the technology of the present disclosure may be applied.

FIG. 17 is a block diagram showing a first example of a schematic configuration of an eNB to which the technology of the present disclosure may be applied. An eNB 1800 includes one or more antennas 1810 and a base station device 1820. The base station device 1820 and each of the antennas 1810 may be connected to each other via an RF cable.

Each of the antennas 1810 includes a single or multiple antenna elements (such as multiple antenna elements included in a multiple-input multiple-output (MIMO) antenna), and is used for the base station device 1820 to transmit and receive wireless signals. As shown in FIG. 17, the eNB 1800 may include multiple antennas 1810. For example, the multiple antennas 1810 may be compatible with multiple frequency bands used by the eNB 1800. Although FIG. 17 shows an example in which the eNB 1800 includes multiple antennas 1810, the eNB 1800 may also include a single antenna 1810.

The base station device 1820 includes a controller 1821, a memory 1822, a network interface 1823, and a wireless communication interface 1825.

The controller 1821 may be, for example, a CPU or a DSP, and manipulate various functions of a higher layer of the base station device 1820. For example, the controller 1821 generates a data packet based on data in a signal processed by the wireless communication interface 1825, and transmits the generated packet via the network interface 1823. The controller 1821 may bundle data from multiple baseband processors to generate a bundled packet, and transfer the generated bundled packet. The controller 1821 may have a logical function for performing control such as radio resource control, radio bearer control, mobility management, admission control, and scheduling. This control may be executed in conjunction with nearby eNBs or core network nodes. The memory 1822 includes an RAM and an ROM, and stores programs executed by the controller 1821 and various types of control data (such as a terminal list, transmission power data, and scheduling data).

The network interface 1823 is a communication interface for connecting the base station device 1820 to a core network 1824. The controller 1821 may communicate with a core network node or another eNB via the network interface 1823. In this case, the eNB 1800 and the core network node or other eNBs may be connected to each other through a logical interface (such as an S1 interface and an X2 interface). The network interface 1823 may also be a wired communication interface, or a wireless communication interface for a wireless backhaul line. If the network interface 1823 is a wireless communication interface, the network interface 1823 may use a higher frequency band for wireless communications than the frequency band used by the wireless communication interface 1825.

The wireless communication interface 1825 supports any cellular communication scheme (such as Long Term Evolution (LTE) and LTE-Advanced), and provides wireless connection to a terminal located in a cell of the eNB 1800 via an antenna 1810. The wireless communication interface 1825 may generally include, for example, a baseband (BB) processor 1826 and an RF circuit 1827. The BB processor 1826 may perform, for example, encoding/decoding, modulation/demodulation, and multiplexing/demultiplexing, and perform various types of signal processing of layers (such as L1, medium access control (MAC), radio link control (RLC), and packet data convergence protocol (PDCP)). Instead of the controller 1821, the BB processor 1826 may have a part or all of the above-mentioned logical functions. The BB processor 1826 may be a memory storing a communication control program, or a module including a processor and related circuits configured to execute the program. The function of the BB processor 1826 may be changed by updating the program. The module may be a card or a blade inserted into a slot of the base station device 1820. Alternatively, the module may be a chip mounted on a card or blade. Meanwhile, the RF circuit 1827 may include, for example, a mixer, a filter, and an amplifier, and transmit and receive a wireless signal via the antenna 1810.

As shown in FIG. 17, the wireless communication interface 1825 may include multiple BB processors 1826. For example, the multiple BB processors 1826 may be compatible with multiple frequency bands used by the eNB 1800. As shown in FIG. 17, the wireless communication interface 1825 may include multiple RF circuits 1827. For example, the multiple RF circuits 1827 may be compatible with multiple antenna elements. Although FIG. 17 shows an example in which the wireless communication interface 1825 includes multiple BB processors 1826 and multiple RF circuits 1827, the wireless communication interface 1825 may also include a single BB processor 1826 or a single RF circuit 1827.

In the eNB 1800 shown in FIG. 17, the configuration unit 1310 in the electronic device 1300 described with reference to FIG. 13 may be implemented by the controller 1821 and the wireless communication interface 1825 (optionally and the antenna 1810). The reception unit 1320 in the electronic device 1300 may be implemented by the wireless communication interface 1825 (optionally and the antenna 1810). The response unit 1330 in the electronic device 1300 may be implemented by the controller 1821 (optionally and the wireless communication interface 1825 and the antenna 1810).

Second Application Example

Figure 18:
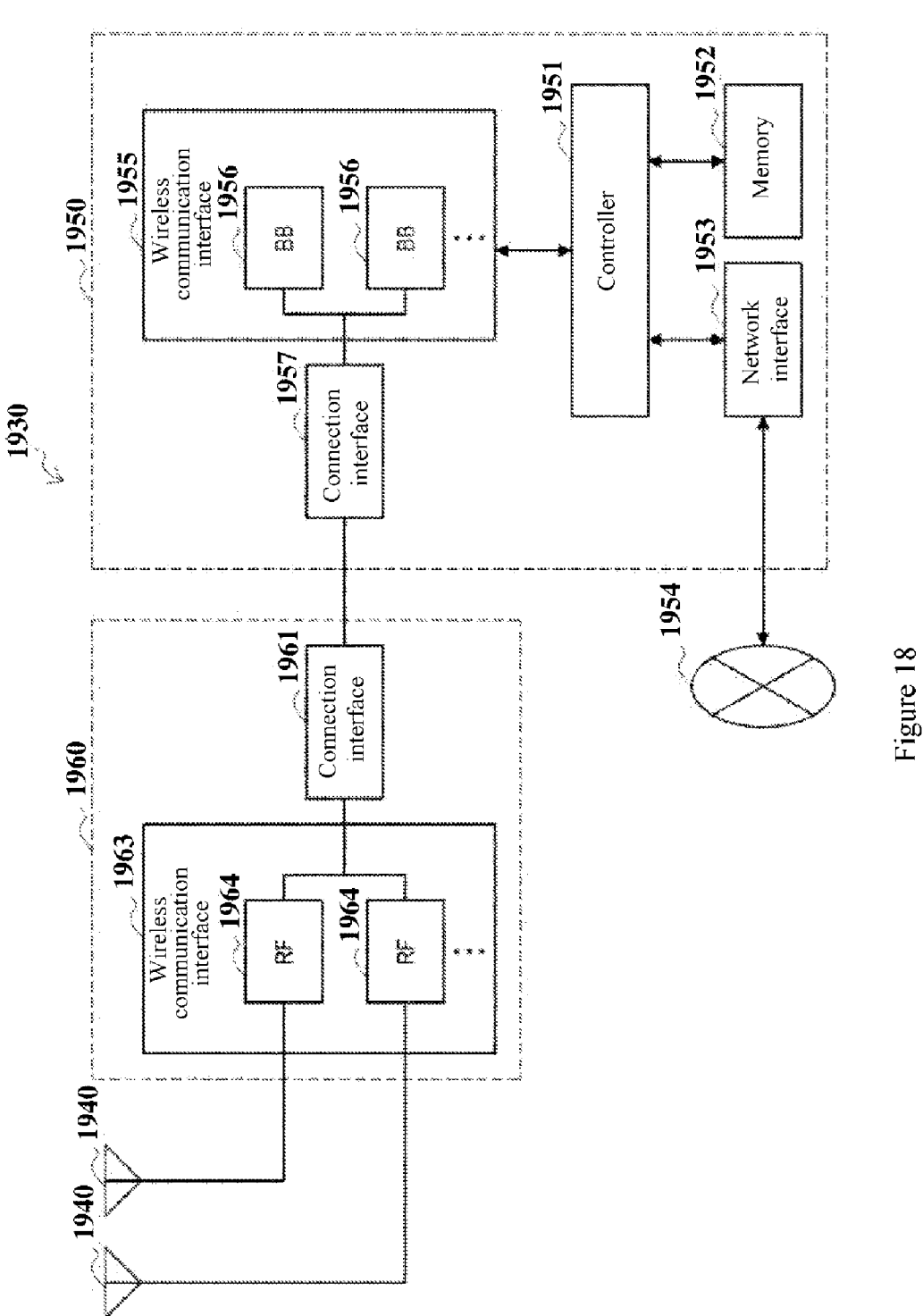
FIG. 18 is a block diagram showing a second example of a schematic configuration of an eNB to which the technology of the present disclosure may be applied.

FIG. 18 is a block diagram showing a second example of a schematic configuration of an eNB to which the technology of the present disclosure may be applied. An eNB 1930 includes one or more antennas 1940, a base station device 1950, and an RRH 1960. The RRH 1960 and each antenna 1940 can be connected to each other via an RF cable. The base station device 1950 and the RRH 1960 may be connected to each other via a high-speed line such as an optical fiber cable.

Each of the antennas 1940 includes a single or multiple antenna elements (such as multiple antenna elements included in a MIMO antenna) and is used for the RRH 1960 to transmit and receive a wireless signal. As shown in FIG. 18, the eNB 1930 may include multiple antennas 1940. For example, the multiple antennas 1940 may be compatible with multiple frequency bands used by the eNB 1930. Although FIG. 18 shows an example in which the eNB 1930 includes multiple antennas 1940, the eNB 1930 may also include a single antenna 1940.

The base station device 1950 includes a controller 1951, a memory 1952, a network interface 1953, a wireless communication interface 1955, and a connection interface 1957. The controller 1951, the memory 1952, and the network interface 1953 are the same as the controller 1821, the memory 1822, and the network interface 1823 as described with reference to FIG. 17. The network interface 1953 is a communication interface used to connect the base station device 1950 to the core network 1954.

The wireless communication interface 1955 supports any cellular communication scheme (such as LTE and LTE-Advanced), and provides wireless communications to a terminal located in a sector corresponding to the RRH 1960 via the RRH 1960 and the antenna 1940. The wireless communication interface 1955 may generally include, for example, a BB processor 1956. The BB processor 1956 is the same as the BB processor 1826 described with reference to FIG. 17 except that the BB processor 1956 is connected to the RF circuit 1964 of the RRH 1960 via the connection interface 1957. As shown in FIG. 18, the wireless communication interface 1955 may include multiple BB processors 1956. For example, the multiple BB processors 1956 may be compatible with multiple frequency bands used by the eNB 1930. Although FIG. 18 shows an example in which the wireless communication interface 1955 includes multiple BB processors 1956, the wireless communication interface 1955 may also include a single BB processor 1956.

The connection interface 1957 is an interface for connecting the base station device 1950 (wireless communication interface 1955) to the RRH 1960. The connection interface 1957 may also be a communication module for communication in the above-mentioned high-speed line that connects the RRH 1960 to the base station device 1950 (wireless communication interface 1955).

The RRH 1960 includes a connection interface 1961 and a wireless communication interface 1963.

The connection interface 1961 is an interface for connecting the RRH 1960 (wireless communication interface 1963) to the base station device 1950. The connection interface 1961 may also be a communication module for communication in the above-mentioned high-speed line.

The wireless communication interface 1963 transmits and receives wireless signals via the antenna 1940. The wireless communication interface 1963 may generally include, for example, an RF circuit 1964. The RF circuit 1964 may include, for example, a mixer, a filter, and an amplifier, and transmit and receive wireless signals via the antenna 1940. As shown in FIG. 18, the wireless communication interface 1963 may include multiple RF circuits 1964. For example, the multiple RF circuits 1964 may support multiple antenna elements. Although FIG. 18 shows an example in which the wireless communication interface 1963 includes multiple RF circuits 1964, the wireless communication interface 1963 may also include a single RF circuit 1964.

In the eNB 1930 shown in FIG. 18, the configuration unit 1310 in the electronic device 1300 described with reference to FIG. 13 may be implemented by the controller 1821 and the wireless communication interface 1825 (optionally, and the antenna 1810). The reception unit 1320 in the electronic device 1300 may be implemented by the wireless communication interface 1963 (optionally, and the antenna 1940). The response unit 1330 in the electronic device 1300 may be implemented by the controller 1951 and the wireless communication interface 1963 (optionally, and the antenna 1940).

Application Example about User Equipment

First Application Example

Figure 19:
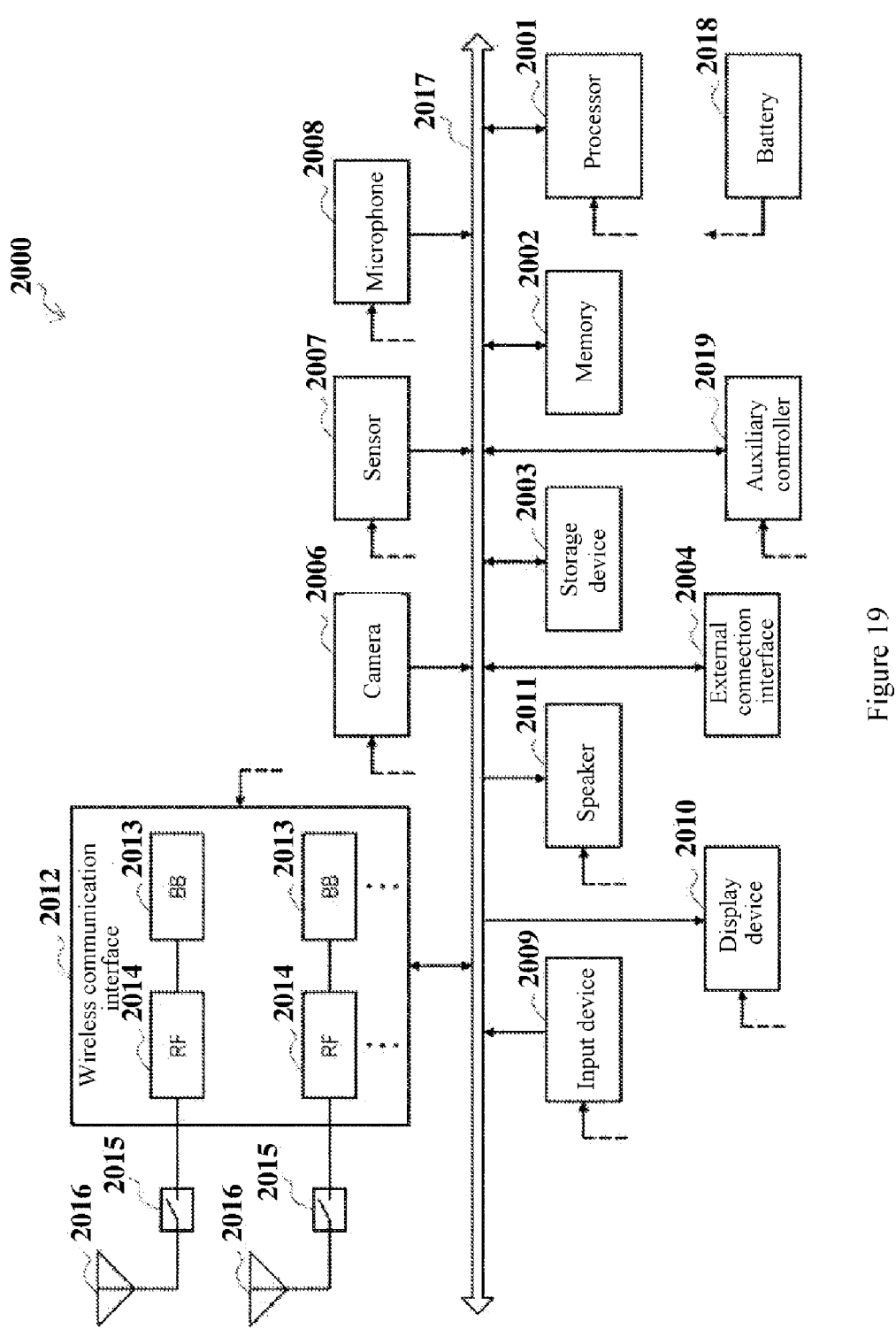
FIG. 19 is a block diagram showing an example of a schematic configuration of a smartphone to which the technology according to the present disclosure may be applied.

FIG. 19 is a block diagram showing an example of a schematic configuration of a smart phone 2000 to which the technology of the present disclosure may be applied. The smart phone 2000 includes a processor 2001, a memory 2002, a storage device 2003, an external connection interface 2004, a camera device 2006, a sensor 2007, a microphone 2008, an input device 2009, a display device 2010, a speaker 2011, a wireless communication interface 2012, one or more antenna switches 2015, one or more antennas 2016, a bus 2017, a battery 2018, and an auxiliary controller 2019.

The processor 2001 may be, for example, a CPU or a system on a chip (SoC), and controls the functions of the application layer and other layers of the smart phone 2000. The memory 2002 includes an RAM and an ROM, and stores data and programs executed by the processor 2001. The storage device 2003 may include a storage medium such as a semiconductor memory and a hard disk. The external connection interface 2004 is an interface for connecting an external device (such as a memory card and a universal serial bus (USB) device) to the smart phone 2000.

The camera device 2006 includes an image sensor (such as a charge coupled device (CCD) and a complementary metal oxide semiconductor (CMOS)), and generates a captured image. The sensor 2007 may include a group of sensors, such as a measurement sensor, a gyroscope sensor, a geomagnetic sensor, and an acceleration sensor. The microphone 2008 converts sound inputted to the smart phone 2000 into an audio signal. The input device 2009 includes, for example, a touch sensor, a keypad, a keyboard, a button, or a switch configured to detect a touch on a screen of the display device 2010, and receives an operation or information input from a user. The display device 2010 includes a screen (such as a liquid crystal display (LCD) and an organic light emitting diode (OLED) display), and displays an output image of the smart phone 2000. The speaker 2011 converts an audio signal outputted from the smart phone 2000 into sound.

The wireless communication interface 2012 supports any cellular communication scheme (such as LTE and LTE-Advanced), and performs wireless communication. The wireless communication interface 2012 may generally include, for example, a BB processor 2013 and an RF circuit 2014. The BB processor 2013 may perform, for example, encoding/decoding, modulation/demodulation, and multiplexing/demultiplexing, and perform various types of signal processing for wireless communications. Further, the RF circuit 2014 may include, for example, a mixer, a filter, and an amplifier, and transmit and receive wireless signals via the antenna 2016. It should be noted that, although FIG. 19 shows a situation where one RF link is connected to one antenna, this is only illustrative, and a situation where one RF link is connected to multiple antennas through multiple phase shifters is also included. The wireless communication interface 2012 may be a chip module on which the BB processor 2013 and the RF circuit 2014 are integrated. As shown in FIG. 19, the wireless communication interface 2012 may include multiple BB processors 2013 and multiple RF circuits 2014. Although FIG. 19 shows an example in which the wireless communication interface 2012 includes multiple BB processors 2013 and multiple RF circuits 2014, the wireless communication interface 2012 may also include a single BB processor 2013 or a single RF circuit 2014.

In addition to the cellular communication scheme, the wireless communication interface 2012 may support another type of wireless communication scheme, such as a short-range wireless communication scheme, a near field communication scheme, and a wireless local area network (LAN) scheme. In this case, the wireless communication interface 2012 may include a BB processor 2013 and an RF circuit 2014 for each wireless communication scheme.

Each of the antenna switches 2015 switches a connection destination of the antenna 2016 among multiple circuits included in the wireless communication interface 2012 (for example, circuits for different wireless communication schemes).

Each of the antennas 2016 includes a single or multiple antenna elements (such as multiple antenna elements included in a MIMO antenna), and is used for the wireless communication interface 2012 to transmit and receive wireless signals. As shown in FIG. 19, the smart phone 2000 may include multiple antennas 2016. Although FIG. 19 shows an example in which the smart phone 2000 includes multiple antennas 2016, the smart phone 2000 may also include a single antenna 2016.

In addition, the smart phone 2000 may include an antenna 2016 for each wireless communication scheme. In this case, the antenna switch 2015 may be omitted from the configuration of the smart phone 2000.

The processor 2001, the memory 2002, the storage device 2003, the external connection interface 2004, the camera device 2006, the sensor 2007, the microphone 2008, the input device 2009, the display device 2010, the speaker 2011, the wireless communication interface 2012, and the auxiliary controller 2019 are connected to each other via the bus 2017. The battery 2018 supplies power to each block of the smart phone 2000 shown in FIG. 19 via a feeder line, and the feeder line is partially shown as a dashed line in the Figure. The auxiliary controller 2019, for example, operates the least necessary function of the smart phone 2000 in the sleep mode.

In the smart phone 2000 as shown in FIG. 19, the reception unit 210 in the electronic device 200 described with reference to FIG. 2 may be implemented by the wireless communication interface 2012 (optionally, and the antenna 2016). The determination unit 220 in the electronic device 200 may be implemented by the processor 2001 (optionally, and the wireless communication interface 2012 and the antenna 2016). The requesting unit 230 in the electronic device 200 may be implemented by the processor 2001, the wireless communication interface 2012 (optionally, and the antenna 2016).

Second Application Example

Figure 20:
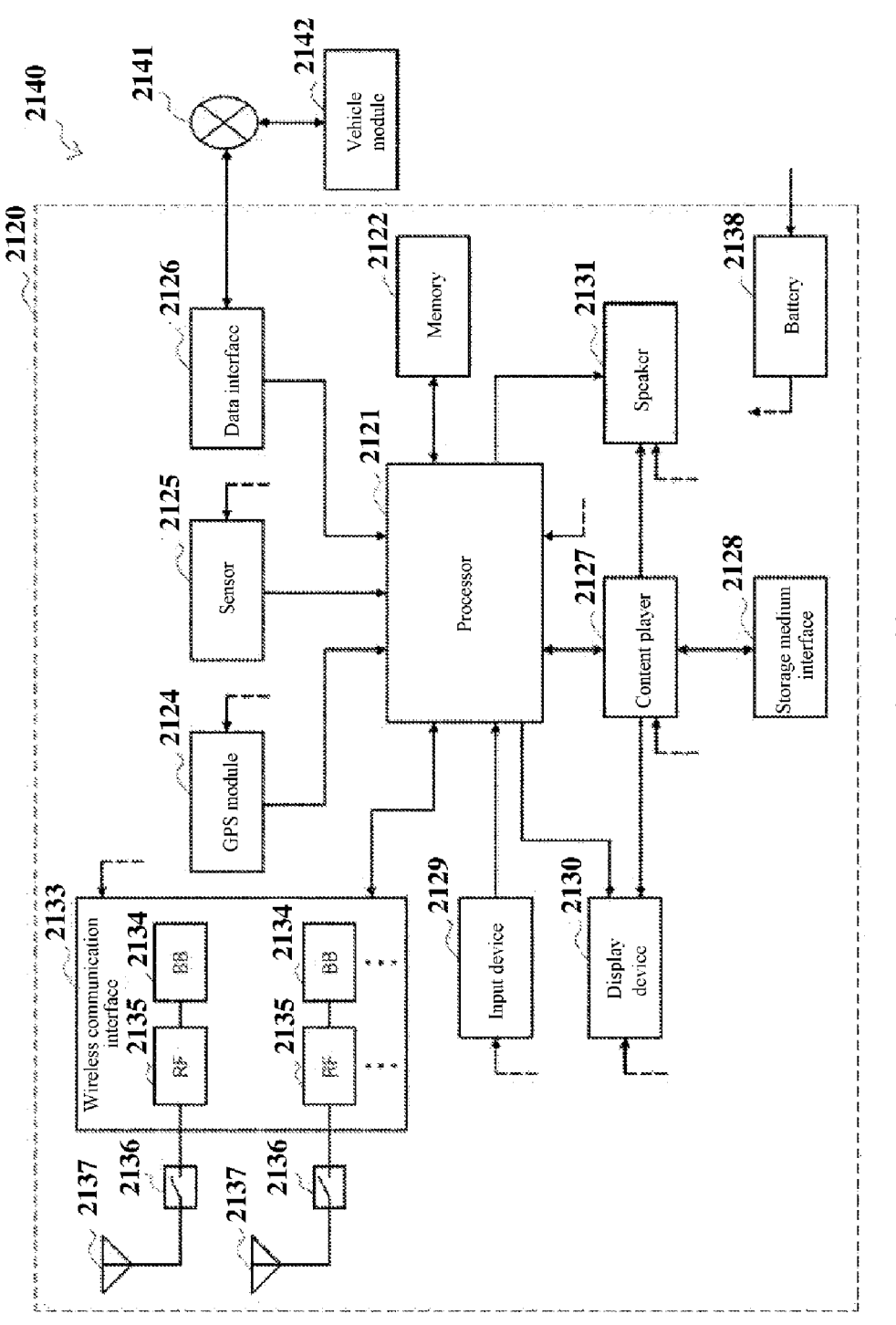
FIG. 20 is a block diagram showing an example of a schematic configuration of a vehicle navigation apparatus to which the technology according to the present disclosure may be applied.

FIG. 20 is a block diagram showing an example of a schematic configuration of a vehicle navigation device 2120 to which the technology according to the present disclosure may be applied. The vehicle navigation device 2120 includes a processor 2121, a memory 2122, a global positioning system (GPS) module 2124, a sensor 2125, a data interface 2126, a content player 2127, a storage medium interface 2128, an input device 2129, a display device 2130, a speaker 2131, a wireless communication interface 2133, one or more antenna switches 2136, one or more antennas 2137, and a battery 2138.

The processor 2121 may be, for example, a CPU or a SoC, and controls the navigation function of the vehicle navigation device 2120 and other functions. The memory 2122 includes an RAM and an ROM, and stores data and programs executed by the processor 2121.

The GPS module 2124 measures a position (such as latitude, longitude, and altitude) of the vehicle navigation device 2120 based on a GPS signal received from a GPS satellite. The sensor 2125 may include a group of sensors, such as a gyroscope sensor, a geomagnetic sensor, and an air pressure sensor. The data interface 2126 is connected to, for example, an in-vehicle network 2141 via a terminal not shown, and acquires data (such as vehicle speed data) generated by the vehicle.

The content player 2127 reproduces content stored in a storage medium (such as CD and a DVD), which is inserted into the storage medium interface 2128. The input device 2129 includes, for example, a touch sensor, a button, or a switch configured to detect a touch on a screen of the display device 2130, and receives an operation or information input from the user. The display device 2130 includes a screen such as an LCD or OLED display, and displays an image of a navigation function or reproduced content. The speaker 2131 outputs the sound of the navigation function or the reproduced content.

The wireless communication interface 2133 supports any cellular communication scheme (such as LTE and LTE-Advanced), and performs wireless communication. The wireless communication interface 2133 may generally include, for example, a BB processor 2134 and an RF circuit 2135. The BB processor 2134 may perform, for example, encoding/decoding, modulation/demodulation, and multiplexing/demultiplexing, and perform various types of signal processing for wireless communication. Further, the RF circuit 2135 may include, for example, a mixer, a filter, and an amplifier, and transmit and receive wireless signals via the antenna 2137. The wireless communication interface 2133 may also be a chip module on which the BB processor 2134 and the RF circuit 2135 are integrated. As shown in FIG. 20, the wireless communication interface 2133 may include multiple BB processors 2134 and multiple RF circuits 2135. Although FIG. 20 shows an example in which the wireless communication interface 2133 includes multiple BB processors 2134 and multiple RF circuits 2135, the wireless communication interface 2133 may also include a single BB processor 2134 or a single RF circuit 2135.

In addition to the cellular communication scheme, the wireless communication interface 2133 may support other types of wireless communication schemes, such as a short-range wireless communication scheme, a near field communication scheme, and a wireless LAN scheme. In this case, the wireless communication interface 2133 may include a BB processor 2134 and an RF circuit 2135 for each wireless communication scheme.

Each of the antenna switches 2136 switches a connection destination of the antenna 2137 among multiple circuits included in the wireless communication interface 2133 (such as, circuits for different wireless communication schemes).

Each of the antennas 2137 includes a single or multiple antenna elements (such as multiple antenna elements included in a MIMO antenna), and is used for the wireless communication interface 2133 to transmit and receive wireless signals. As shown in FIG. 20, the vehicle navigation device 2120 may include multiple antennas 2137. Although FIG. 20 shows an example in which the vehicle navigation device 2120 includes multiple antennas 2137, the vehicle navigation device 2120 may also include a single antenna 2137.

In addition, the vehicle navigation device 2120 may include an antenna 2137 for each wireless communication scheme. In this case, the antenna switch 2136 may be omitted from the configuration of the vehicle navigation device 2120.

The battery 2138 supplies power to each block of the vehicle navigation device 2120 as shown in FIG. 20 via a feeder line, and the feeder line is partially shown as a dashed line in the Figure. The battery 2138 accumulates electric power supplied from the vehicle.

In the vehicle navigation device 2120 shown in FIG. 20, the reception unit 210 in the electronic device 200 described with reference to FIG. 2 may be implemented by the wireless communication interface 2133 (optionally, and the antenna 2137). The determination unit 220 in the electronic device 200 may be implemented by the processor 2121 (optionally, and the wireless communication interface 2133 and the antenna 2137). The requesting unit 230 in the electronic device 200 may be implemented by the processor 2121 and the wireless communication interface 2133 (optionally, and the antenna 2137).

The technology of the present disclosure may also be implemented as an in-vehicle system (or vehicle) 2140 including one or more blocks in a vehicle navigation device 2120, the in-vehicle network 2141, and the vehicle module 2142. The vehicle module 2142 generates vehicle data (such as vehicle speed, engine speed, and failure information), and outputs the generated data to the in-vehicle network 2141.

The basic principle of the present disclosure has been described above in conjunction with embodiments. However, it should be noted that, those skilled in the art should understand that all or any step or component of the methods and the apparatuses according to the present disclosure may be implemented in any computing device (including a processor, a storage medium, and the like.) or a network of computing devices in the form of hardware, firmware, software or a combination thereof. It can be achieved by those skilled in the art utilizing their basic circuit design knowledge or basic programming skills after reading the description of the present disclosure.

Moreover, the present disclosure also proposes a program product storing a machine-readable instruction code that, when read and executed by a machine, can execute the above-mentioned methods according to the embodiments of the present disclosure.

Accordingly, a storage medium for carrying the above-mentioned program product storing a machine-readable instruction codes is further included in the present disclosure. The storage medium includes but is not limited to, a floppy disk, an optical disk, a magneto-optical disk, a storage card, and a memory stick.

In a case of implementing the present disclosure by software or firmware, a program constituting the software is installed from a storage medium or a network to a computer with a dedicated hardware structure. The computer, when installed with various programs, can execute various functions and the like.

The preferred embodiments of the present disclosure have been described above with reference to the accompanying drawings. Apparently, the present disclosure is not limited to the above embodiments. Those skilled in the art may obtain various changes and modifications within the scope of the appended claims, and it should be understood that these changes and modifications are fall within the technical scope of the present disclosure.

For example, the units shown in dashed boxes in the functional block diagrams shown in the drawings indicate that the functional units are optional in the corresponding device, and the various optional functional units may be combined in an appropriate manner to perform required functions.

For example, the functions included in one unit according to the above embodiments may be realized by separate devices. Alternatively, the functions implemented by multiple units in the above embodiments may be implemented by separate devices, respectively. In addition, one of the above functions may be implemented by multiple units. It should be understood that the above configurations are included in the technical scope of the present disclosure.

In this specification, the steps described in the flowchart may be performed in the chronological order described herein, and may be performed in parallel or independently rather than necessarily in the chronological order. In addition, the chronological order in which the steps are performed may be changed appropriately.

Although the embodiments of the present disclosure have been described above in detail in connection with the drawings, it should be appreciated that the embodiments described above are merely illustrative rather than limitative of the present disclosure. Those skilled in the art can make various modifications and variations to the above embodiments without departing from the spirit and scope of the present disclosure. Therefore, the scope of the present disclosure is defined merely by the appended claims and their equivalents.

The invention claimed is:

1. An electronic device, comprising:

processing circuitry, configured to:

receive first configuration information of a first reference signal set and second configuration information of a second reference signal set from a base station, wherein the first configuration information is set independently from the second configuration information, wherein the first reference signal set corresponds to a first transmission and reception point (TRP), and the second reference signal set associated with a second TRP different from the first TRP, and wherein the first reference signal set comprises one or more first reference signals, and the second reference signal set comprises one or more second reference signals, based on the first configuration information, determine whether a first beam failure event occurs for the first reference signal set based on measured signal qualities of at least one of the first reference signals; and based on the second configuration information, determine whether a second beam failure event occurs for the second reference signal set based on measured signal qualities of at least one of the second reference signals, wherein the processing circuitry determines whether the first beam failure event occurs for the first reference signal set by:

measuring a signal quality of the at least one of the first reference signals, and incrementing a first counter associated with the first reference signal set when the signal quality of a reference signal in the first reference signal set is worse than a first threshold, and when the first counter reaches a first maximum count, transmitting a first beam failure recovery request for the first reference signal set, wherein the processing circuitry determines whether the second beam failure event occurs for the second reference signal set by:

measuring a signal quality of at least one of the second reference signals, and incrementing a second counter associated with the second reference signal set when the signal quality of a reference signal in the second reference signal set is worse than a second threshold, and when the second counter reaches a second maximum count, transmitting a second beam failure recovery request for the second reference signal set, wherein the first and second beam failure recovery requests are each included in a single message that comprises a first octet and at least one second octet, wherein a part of the first octet indicates whether the first beam failure event occurs on the first reference signal set and another part of the first octet indicates whether the second beam failure event occurs on the second reference signal set, and wherein the at least one second octet identifies a candidate beam to replace a beam associated with the first or second beam failure event.

2. The electronic device according to claim 1, wherein the first and second beam errors occur simultaneously.

3. The electronic device according to claim 1, wherein the first threshold is different from the second threshold, or the first maximum count is different from the second maximum count.

4. The electronic device according to claim 1, wherein the processing circuitry is further configured to:

transmit the first octet to the base station through a scheduling request from a physical layer to request uplink resources from the base station.

5. The electronic device according to claim 4, wherein the transmitted scheduling request is associated with the beam failure reference signal.

6. The electronic device according to claim 4, wherein the processing circuitry is further configured to:

based on the requested uplink resources, transmit the second octet to the base station through a media access control element or an aperiodic channel state information report.

7. The electronic device according to claim 6, wherein the media access control element or the aperiodic channel state information report comprises identification information of the candidate beam corresponding to the beam failure reference signal.

8. The electronic device according to claim 1, wherein the at least one of the first reference signals comprises at least two of the first reference signals, or the at least one of the second reference signals comprises at least two of the second reference signals.

9. A method performed by an electronic device, the method comprising:

receiving first configuration information of a first reference signal set and second configuration information of a second reference signal set from a base station, wherein the first configuration information is set independently from the second configuration information, wherein the first reference signal set corresponds to a first transmission and reception point (TRP), and the second reference signal set corresponds to a second TRP different from the first TRP, and wherein the first reference signal set comprises one or more first reference signals, and the second reference signal set comprises one or more second reference signals, based on the first configuration information, determining whether a first beam failure event occurs for the first reference signal set based on measured signal qualities of at least one of the first reference signals; and based on the second configuration information, determining whether a second beam failure event occurs for the second reference signal set based on measured signal qualities of at least one of the second reference signals, wherein the processing circuitry determines whether the first beam failure event occurs for the first reference signal set by:

measuring a signal quality of the at least one of the first reference signals, and incrementing a first counter associated with the first reference signal set when the signal quality of a reference signal in the first reference signal set is worse than a first threshold, and when the first counter reaches a first maximum count, transmitting a first beam failure recovery request for the first reference signal set, and wherein the processing circuitry determines whether the second beam failure event occurs for the second reference signal set by:

measuring a signal quality of the at least one of the second reference signals, and incrementing a second counter associated with the second reference signal set when the signal quality of a reference signal in the second reference signal set is worse than a second threshold, and when the second counter reaches a second maximum count, transmitting a second beam failure recovery request for the second reference signal set, wherein the first and second beam failure recovery requests are each included in a single message that comprises a first octet and at least one second octet, wherein a part of the first octet indicates whether the first beam failure event occurs on the first reference signal set and another part of the first octet indicates whether the second beam failure event occurs on the second reference signal set, and wherein the at least one second octet identifies a candidate beam to replace a beam associated with the first or second beam failure event.

10. An electronic device, the electronic device configured as a base station and comprising:

processing circuitry, configured to:

transmit, to another device, first configuration information of a first reference signal set and second configuration information of a second reference signal set from a base station, wherein the first configuration information is set independently from the second configuration information, wherein the first reference signal set corresponds to a first transmission and reception point (TRP), and the second reference signal set associated with a second TRP different from the first TRP, and wherein the first reference signal set comprises one or more first reference signals, and the second reference signal set comprises one or more second reference signals, based on the first configuration information, the other device determines whether a first beam failure event occurs for the first reference signal set based on measured signal qualities of at least one of the first reference signals; and based on the second configuration information, the other device determines whether a second beam failure event occurs for the second reference signal set based on measured signal qualities of at least one of the second reference signals, wherein the other device determines whether the first beam failure event occurs for the first reference signal set by:

measuring a signal quality of the at least one of the first reference signals, and incrementing a first counter associated with the first reference signal set when the signal quality of a reference signal in the first reference signal set is worse than a first threshold, and when the first counter reaches a first maximum count, transmitting a first beam failure recovery request for the first reference signal set, wherein the processing circuitry is configured to receive and process the first beam failure recovery request, wherein the other device determines whether the second beam failure event occurs for the second reference signal set by:

measuring a signal quality of at least one of the second reference signals, and incrementing a second counter associated with the second reference signal set when the signal quality of a reference signal in the second reference signal set is worse than a second threshold, and when the second counter reaches a second maximum count, transmitting a second beam failure recovery request for the second reference signal set, wherein the processing circuitry is configured to receive and process the second beam failure recovery request, wherein the first and second beam failure recovery requests are each included in a single message that comprises a first octet and at least one second octet, wherein a part of the first octet indicates whether the first beam failure event occurs on the first reference signal set and another part of the first octet indicates whether the second beam failure event occurs on the second reference signal set, and wherein the at least one second octet identifies a candidate beam to replace a beam associated with the first or second beam failure event.

11. A method performed by an electronic device configured as a base station, the method comprising:

transmitting, to another device, first configuration information of a first reference signal set and second configuration information of a second reference signal set from a base station, wherein the first configuration information is set independently from the second configuration information, wherein the first reference signal set corresponds to a first transmission and reception point (TRP), and the second reference signal set associated with a second TRP different from the first TRP, and wherein the first reference signal set comprises one or more first reference signals, and the second reference signal set comprises one or more second reference signals, based on the first configuration information, the other device determines whether a first beam failure event occurs for the first reference signal set based on measured signal qualities of at least one of the first reference signals; and based on the second configuration information, the other device determines whether a second beam failure event occurs for the second reference signal set based on measured signal qualities of at least one of the second reference signals, wherein the other device determines whether the first beam failure event occurs for the first reference signal set by:

measuring a signal quality of the at least one of the first reference signals, and incrementing a first counter associated with the first reference signal set when the signal quality of a reference signal in the first reference signal set is worse than a first threshold, and when the first counter reaches a first maximum count, transmitting a first beam failure recovery request for the first reference signal set, wherein the processing circuitry is configured to receive and process the first beam failure recovery request, wherein the other device determines whether the second beam failure event occurs for the second reference signal set by:

measuring a signal quality of at least one of the second reference signals, and incrementing a second counter associated with the second reference signal set when the signal quality of a reference signal in the second reference signal set is worse than a second threshold, and when the second counter reaches a second maximum count, transmitting a second beam failure recovery request for the second reference signal set; and receiving and processing the second beam failure recovery request, wherein the first and second beam failure recovery requests are each included in a single message that comprises a first octet and at least one second octet, wherein a part of the first octet indicates whether the first beam failure event occurs on the first reference signal set and another part of the first octet indicates whether the second beam failure event occurs on the second reference signal set, and wherein the at least one second octet identifies a candidate beam to replace a beam associated with the first or second beam failure event.

* * * * *